United States Patent [19]

Hirsh et al.

[11] Patent Number: 5,767,269

[45] Date of Patent: Jun. 16, 1998

[54] PROCESSES FOR THE PREPARATION OF LOW-AFFINITY, LOW MOLECULAR WEIGHT HEPARINS USEFUL AS ANTITHROMBOTICS

[75] Inventors: Jack Hirsh. Hamilton. Canada; Patrick N. Shaklee. Pardeeville; James E. Knobloch. Cross Plains. both of Wis.; Jeffrey I. Weitz. Ancaster; Edward Young. Oakville. both of Canada

[73] Assignee: Hamilton Civic Hospitals Research Development Inc., Canada

[21] Appl. No.: 722,408

[22] Filed: Oct. 1, 1996

[51] Int. Cl.[6] ............................ C07H 1/00; C07H 5/04; A61K 31/725
[52] U.S. Cl. ................. 536/55.3; 536/21; 536/124; 514/56
[58] Field of Search ................. 536/124, 21, 55.3; 514/56

[56] References Cited

U.S. PATENT DOCUMENTS

| | | | |
|---|---|---|---|
| 4,281,108 | 7/1981 | Fussi | 536/21 |
| 4,351,938 | 9/1982 | Barnett | 536/21 |
| 4,496,550 | 1/1985 | Lindahl et al. | 514/54 |
| 4,500,519 | 2/1985 | Lormeau et al. | 514/56 |
| 4,629,699 | 12/1986 | Biachini | 435/101 |
| 4,687,765 | 8/1987 | Vairel et al. | 514/56 |
| 4,791,195 | 12/1988 | Bianchini | 536/21 |
| 4,847,338 | 7/1989 | Linhardt et al. | 536/54 |
| 4,916,219 | 4/1990 | Linhardt et al. | 536/21 |
| 4,933,326 | 6/1990 | Bianchini et al. | 514/56 |
| 4,942,156 | 7/1990 | Floey et al. | 514/56 |
| 4,981,955 | 1/1991 | Lopez | 536/21 |
| 4,990,502 | 2/1991 | Lormeau et al. | 536/55.3 |
| 5,010,063 | 4/1991 | Piani et al. | 514/56 |
| 5,013,724 | 5/1991 | Petitou et al. | 514/54 |
| 5,019,649 | 5/1991 | Lormeau et al. | 536/21 |
| 5,039,529 | 8/1991 | Bergendahl et al. | 424/630 |
| 5,084,564 | 1/1992 | Vila et al. | 536/21 |
| 5,106,734 | 4/1992 | Nielsen | 435/84 |
| 5,236,910 | 8/1993 | Egidio et al. | 514/56 |
| 5,280,016 | 1/1994 | Conrad et al. | 514/56 |
| 5,547,944 | 8/1996 | Mascellani et al. | 514/54 |

FOREIGN PATENT DOCUMENTS

| | | |
|---|---|---|
| 276964 | 1/1964 | Australia . |
| 101 141 | 2/1984 | European Pat. Off. . |
| 121 067 | 4/1987 | European Pat. Off. . |
| 244 235 | 11/1987 | European Pat. Off. . |
| 048 231 | 6/1988 | European Pat. Off. . |
| 337 327 | 10/1989 | European Pat. Off. . |
| 214 879 | 11/1990 | European Pat. Off. . |
| 496 233 | 7/1992 | European Pat. Off. . |
| 511 075 | 10/1992 | European Pat. Off. . |
| 513 513 | 11/1992 | European Pat. Off. . |
| 355 905 | 1/1993 | European Pat. Off. . |
| 293 539 | 6/1994 | European Pat. Off. . |
| 287 477 | 11/1994 | European Pat. Off. . |
| 623 629 | 11/1994 | European Pat. Off. . |
| WO 82/01005 | 4/1982 | WIPO . |
| WO 82/03627 | 10/1982 | WIPO . |
| WO 90/01501 | 2/1990 | WIPO . |
| WO 90/04607 | 5/1990 | WIPO . |
| WO 90/04970 | 5/1990 | WIPO . |
| WO 91/15217 | 10/1991 | WIPO . |
| WO 92/02232 | 2/1992 | WIPO . |
| WO 92/11294 | 7/1992 | WIPO . |
| WO 92/17187 | 10/1992 | WIPO . |
| WO 92/17188 | 10/1992 | WIPO . |
| WO 92/17506 | 10/1992 | WIPO . |
| WO 92/18545 | 10/1992 | WIPO . |
| WO 93/05074 | 3/1993 | WIPO . |
| WO 93/16112 | 8/1993 | WIPO . |
| WO 93/19737 | 10/1993 | WIPO . |
| WO 94/12618 | 6/1994 | WIPO . |
| WO 95/12403 | 5/1995 | WIPO . |

OTHER PUBLICATIONS

Lucas. et al.. "Synthesis of Heparin–Like Pentamers Containing Opened Uronic Acid." *Tetrahedron*, 6(24):8207–8228 (1990).

Alhenc–Gelas. et al., "Laboratory Control of Low–Molecular–Weight Heparins: Needs and Possibilities." *Fundemental and Clinical Cardiology*, 19:43–54 (1994).

Atha. et al.. "Physicochemical Characterization of Low Molecular Weight Heparin." *J. Pharm. Sciences*, 84(3):360–364 (Mar. 1995).

Barzu. et al.. "O–Acylated heparin derivatives with low anticoagulant activity decrease proliferation and increase α–smooth muscle active expression in cultured arterial smooth muscle cells." *Euro. J. Pharm.*, 219:225–233 (1992).

(List continued on next page.)

*Primary Examiner*—Kathleen K. Fonda
*Attorney, Agent, or Firm*—Townsend & Townsend & Crew LLP

[57] ABSTRACT

The present invention generally relates to a processes for preparing low affinity, low molecular weight heparins (LA-LWM-heparins) which are endowed with pharmacological and therapeutic properties that are surprisingly advantageous. In one embodiment, the process comprises: (1) nitrous acid depolymerization of unfractionated heparin to yield low molecular weight heparin (LMWH); (2) oxidation of the resulting LMWH to open the ring structures the nonsulfated uronic acid moieties using, for example, sodium periodate; and (3) reduction of the oxidized LMWH to reduce the aldehydes (to alcohols) formed during the depolymerization and oxidation steps using, for example, sodium borohydride. The resulting LA-LMW-heparins are capable of inactivating thrombin bound to fibrin within a thrombus or clot, whereby the ability of clot-bound thrombin to catalytically promote further clot accretion is substantially diminished or eliminated. As such, the resulting LA-LMW-heparins are useful for preventing thrombosis in the circuit of cardiac bypass apparatus and in patients undergoing renal dialysis, and for treating patients suffering from or at risk of suffering from thrombus-related cardiovascular conditions, such as unstable angina, acute myocardial infarction (heart attack), cerebrovascular accidents (stroke), pulmonary embolism, deep vein thrombosis, arterial thrombosis, etc.

26 Claims, 15 Drawing Sheets

OTHER PUBLICATIONS

Barzu, et al., "Preparation and Anti–HIV Activity of O–Acylated Heparin and Dermatan Sulfate Derivatives with Low Anticoagulant Effect," *J. Med. Chem.*, 36:3546–3555 (1993).

Cade, et al., "A Comparison of the Antithrombotic and Haemorrhagic Effects of Low Molecular Weight Heparin Fractions: The Influence of the Method of Preparation," *Thrombosis Research*, 35:613–625 (1984).

Casu, et al., "Retention of Antilipemic Activity by Periodate–oxidized Non–anticoagulant Heparins," *Arzneim–Forsch./Drug. Res.*, 36(i), Nr. 637–642 (1986).

Cifonelli, et al., "The Distribution of 2–Acetamido–2–Deoxy–D–glucose residues in Mammalian Heparins," *Carbo. Res.*, 21:173–186 (1972).

Conrad, et al., "Structural Analysis of Periodate–Oxidized Heparin," *Heparin and Related Polysaccharides*,Edited by D.A. Lane et al., Plenum Press, New York, pp. 31–36 (1992).

Doctor, et al., "Anticoagulant Properties of Semisynthetic Polysaccharide Sulfates," *Thrombosis Research*, 64:413–425 (1991).

Fransson, et al., "Periodate Oxidation of the D–Glucuronic Acid Residues in Heparan Sulphate and Heparin," *Carbohydrate Research*, 62:235–244 (1978).

Fransson, et al., "Relationship Between Anticoagulant Activity of Heparin and Susceptibility to Periodate Oxidation," *FEBS Letters*, 97 (1): 119–123 (1979).

Fransson, et al., Periodate Oxidation and Alkaline Degradation of Heparin–Related Glycans, *Carbohydrate Research*, 80:131–145 (1990).

Horton, et al., The Nitrous Acid Deamination of Glycosides and Acetates of 2–Amino–2–Deoxy–D–Glucose, *Carbo. Res.*, 30:367–374 (1973).

Jordan, et al., "The Kinetics of Hemostatic Enzyme–Antithrombin Interactions in the Presence of Low Molecular Weight Heparin," *J. of Biol. Chem.*, 255(21):10081–10090 (1980).

Lagunoff, et al., "Determination of 2–Deopxy–2–Sulfoaminohexose Content of Mucopolysaccharides," *Archives of Biochem. and Biophys.*, 99:396–400 (1962).

Lindhardt, et al., "Oligosaccharide Mapping of Low Molecular Weight Heparins: Structure and Activity Differences, " *J. Med. Chem.*, 33:1639–1645 (1990).

Mascellani, et al., Active Sites of Dermatan Sulfate for Heparin Cofactor II. Isolation of a Nonasaccharide Fragment Containing Four Disaccharide Sequences |α–L–Iduronic Acid 2–O–Sulfate (1,3)–β–D–N–Acetylgalactosamine 4–Sulfate|, *J. Carbohydrate Chem.*, 14(8):1165–1177 (1995)

Mattsson, et al., "Antithromotic Effects of Heparin Oligosaccharides," *Annals of the N.Y. Acad. Sci.*, 556:323–332 (Jun., 1989).

Nagase, et al., "Depolymerized Holothurian Glycosaminoglycan With Novel Anticoagulant Actions: Antithrombin III–and Heparin Cofactor II—Independent Inhibition of Factor X Activation by Factor IXa–Factor VIIIa Complex and Heparin Cofactor II—Dependent Inhibition of Thrombin," *Blood*, 85(6):1527–1534 (Mar. 1995).

Schoen, et al., "The Effect of Sulfation of the Anticoagulant and Antirthombin III—Binding Properties of a Heparin Fraction with Low Affinity for Antithrombin III,", *Thrombosis Research*, 57:415–423 (1990).

Shimotori, et al., "Comparative Studies of Heparin Cofactor Activity Toward Antithrombin III and Heparin Cofactor II, and Antithrombin III Affinity Between Low Molecular Weight heparin and Unfractioned Heparin," *Seminars in Thrombosis and Hemostasis*, 16 (supp.):71–76 (1990).

Shively, et al., "Formation of Anhydrosugars in the Chemical Depolymerization of Heparin," *Biochemistry*, 15(18):3932–3942 (1976).

Shively, et al., "Nearest Neighbor Analysis of Heparin: Identification and Quantitation of the Products Formed by Selective Depolymerization Procedures," *Biochemistry*, 15(18):3943–3950 (1976).

Shively, et al., "Stoichlometry of the Nitrous Acid Deaminative Cleavage of Model Amino Sugar Glycosides and Glycosaminoglycufonans,"*Biochemistry*, 9(1):33–43 (1970).

Svahn, et al., "Inhibition of angiogenesis by heparin fragments in the presence of hydrocortisone," *Carbohydrate Polymers*, 18:9–16 (1992).

Tollefsen, et al., "Effect of Low Molecular Weight Heparin Preparations on the Inhibition of Thrombin by Heparin Cofactor II. " *Seminars in Thrombosis and Hemostasis*, 16(supp.):66–70 (1990).

Weitz, et al., "New Anticoagulant Strategies," *J. Lab. Clin. Med.*, 122(4):364–373 (Oct. 1993).

PROCESSES FOR THE PREPARATION OF LOW-AFFINITY, LOW MOLECULAR WEIGHT HEPARINS USEFUL AS ANTITHROMBOTICS

FIELD OF THE INVENTION

The present invention relates generally to processes for the preparation of low affinity, low molecular weight heparins (LA-LMW-heparins) which are useful, inter alia, as antithrombotics. More particularly, the present invention relates to processes for the preparation of LA-LMW-heparins, the processes generally comprising: (1) depolymerizing unfractionated heparin; (2) oxidizing the resultant low molecular weight heparin; and (3) reducing the oxidized, low molecular weight heparin. The resulting LA-LMW-heparins have unexpected and surprisingly superior pharmacological and therapeutic properties.

BACKGROUND OF THE INVENTION

Thrombosis is a pathological manifestation of the clotting cascade in blood vessels. The clotting cascade is a complex biological process which results in the formation of a clot or thrombus composed of platelets and fibrin. Thrombin is bound to fibrin in the clot where it is catalytically active and able to amplify its production over 1000-fold by activating clotting factors in the surrounding blood. The ability of blood to generate thrombin is fundamental to the prevention of excessive bleeding at wound sites (hemostasis). Thrombin is important in hemostasis because it stimulates platelet aggregation and fibrin formation when a blood vessel is severed. Therefore, an ideal antithrombin would be an agent which can pacify the clot by inactivating fibrin-bound thrombin at concentrations which do not produce abnormal bleeding resulting from inhibition of thrombin production in the general circulation.

Thrombosis, which can complicate atherosclerosis, can cause partial or total occlusion of the affected blood vessel, thereby leading to a number of important cardiovascular complications, including unstable angina, acute myocardial infarction (heart attack), cerebral vascular accidents (stroke), pulmonary embolism, deep vein thrombosis and arterial thrombosis. Such diseases are a major cause of disability and mortality throughout the world, but particularly in Western societies. Moreover, thrombin and, in particular, surface-bound thrombin play a role in thrombus formation in cardiac bypass circuits, after angioplasty and during and after thrombolytic therapy for acute myocardial infarction. Therefore, patients undergoing these procedures must be treated with very high doses of heparin to prevent thrombosis. Although these high doses of heparin may effectively prevent clotting, they can give rise to serious bleeding complications.

The clot or thrombus, which forms as a result of activation of the clotting cascade, contains fibrin, platelets and numerous other blood components. Thrombin bound to fibrin remains active and causes growth of the clot by continued cleavage of fibrinogen and activation of platelets and other coagulation factors, such as factor V and factor VIII. Moreover, unlike free thrombin which is readily inactivated by naturally occurring antithrombins (e.g., antithrombin III (ATIII)), clot-bound thrombin is protected from inactivation. As a result, the clot acts as a reservoir for active thrombin which triggers further clot growth. In addition, thrombin also induces smooth cell proliferation and, thus, may be involved in proliferative responses, such as graft-induced atherosclerosis and restenosis after angioplasty or atherectomy.

Because thrombin is critical to thrombus formation, the use of thrombin inhibitors for treating thrombosis and thrombotic complications has long been proposed. A number of partially effective inhibitors have been in use for years. Heparin, for example, can be used as an anticoagulant and antithrombin agent to inhibit fibrin formation, platelet aggregation and thrombus formation. Heparin, however, has a number of limitations. For example, it has biophysical limitations because it acts as an anticoagulant by activating ATIII and, thus, it is relatively ineffective at inactivating fibrin-bound thrombin at safe doses, thereby allowing the continued growth of thrombus mediated by thrombin bound to fibrin in the pre-existing thrombus. In addition, the doses required to produce an antithrombotic effect are quite unpredictable and, therefore, the dosage must be monitored closely. Low molecular weight heparins (LMWH) can also be used as anticoagulants and antithrombin agents to inhibit fibrin formation, platelet aggregation and thrombus formation. LMWHs act by activating ATIII and, as such, have the same biophysical limitations as heparin. However, LMWHs produce a more predictable anticoagulant effect than heparin. Thus, both heparin and LMWH have the limitation of not readily inactivating surface-bound thrombin. The consequences of this are (a) high concentrations are needed to achieve an antithrombin effect which can lead to excessive bleeding, and (b) once the agents are cleared from the circulation, the surface-bound thrombin can reactivate clotting.

Inactivation of clot-bound thrombin may be achieved with another set of compounds known as the direct thrombin inhibitors. Such inhibitors include hirudin and its derivatives, and inhibitors of the active site of thrombin, such as argatroban and PPACK (D-phenylalanyl-L-propyl-L-arginyl chloromethyl ketone). Hirudin is an antithrombin substance extracted from the salivary glands of leeches. Related compounds include hirulog which is a small, synthetic analog of hirudin. While these drugs are able to inhibit clot-bound thrombin, they have the following limitations. First, they do not typically inactivate clot-bound thrombin selectively, but do so at the same concentrations which are required to inhibit free thrombin. Secondly, the inactivation of thrombin is generally stoichiometric and, thus, unless very high concentrations are used, the inhibitory effect can be overcome by the large amounts of thrombin that are generated at sites where surface-bound thrombin accumulates (e.g., on bypass circuits, or at sites of arterial or venous thrombosis). As a result of the above two limitations, high concentrations of direct thrombin inhibitors (e.g., hirudin) must typically be administered to interact with and inhibit the free thrombin generated by clot-bound thrombin. Such high inhibitor concentrations can, however, cause unwanted bleeding. Moreover, direct thrombin inhibitors (e.g., hirudin, its analogs and LMW active site thrombin inhibitors, such as argatroban) are generally reversible and, thus, the inhibitory effect is lost when the drugs are cleared from the blood. Unfortunately, this reversible inhibition can lead to rebound activation of coagulation.

For the foregoing reasons, there is a need for improved compositions for inhibiting thrombogenesis associated with cardiovascular disease and methods of making same. The present invention fulfills these and other needs.

SUMMARY OF THE INVENTION

The present invention provides, inter alia, processes for the preparation of low affinity, low molecular weight heparins (LA-LMWHs) which are useful, inter alia, as antithrombotics. More particularly, the present invention relates to processes for the preparation of LA-LMW-heparins, the processes generally comprising: (1) nitrous acid depolymerization of unfractionated heparin to yield low molecular weight heparin (LMWH); (2) oxidation of the resulting LMWH to open the ring structures of the nonsulfated uronic acid moieties; and (3) reduction of the oxidized LMWH to reduce the aldehydes (to alcohols) formed during the depolymerization and oxidation steps. The resulting LA-LMW-heparins have unexpected and surprisingly superior pharmacological and therapeutic properties.

In one embodiment, the present invention provides a process for the preparation of LA-LMW-heparin, the process comprising: (i) depolymerising unfractioned heparin; (ii) oxidizing the low molecular weight fraction; and (iii) reducing the cleaved fraction. In the first step, unfractionated heparin is depolymerized using nitrous acid. The nitrous acid can be added directly or, alternatively, it can be generated in situ. This step is typically carried out at ambient temperature, i.e., at a temperature ranging from about 18° C. to about 24° C. The resulting LMW-heparin will typically have an average (weight average (Mw)) molecular weight of between about 3,000 and about 8,000 Daltons. In the second step, the resulting LMWH is oxidized using an oxidizing agent. In a presently preferred embodiment, the oxidizing agent employed is a salt of periodic acid and, in particular, sodium periodate (also known as sodium meta-periodate). This step is typically carried out in the absence of light at a temperature ranging from about 4° C. to about 10° C. In the third step, the oxidized, LMW-heparin is reduced using a reducing agent, such as sodium or potassium borohydride. In a presently preferred embodiment, sodium borohydride is the reducing agent employed. As with the previous step, this step is typically carried out at a temperature ranging from about 4° C. to about 10° C. Thereafter, the resulting LA-LMW-heparin is recovered from the reaction mixture and purified by, for example, precipitation, ultrafiltration or chromatography methods. Optionally, an ATIII affinity chromatography column is used to further reduce the affinity of the LA-LMW-heparin for ATIII.

In a presently preferred embodiment, the present invention provides a process for the preparation of LA-LMW-heparin, the process comprising: (i) depolymerizing standard unfractionated heparin by nitrous acid depolymerization; (ii) oxidizing the depolymerized heparin with sodium periodate in an aqueous medium for about 72 hours at a temperature ranging from 4° C. to about 10° C., and stopping the oxidation reaction by the addition of excess glycerol followed by extensive dialysis against distilled water using an ultrafiltration device equipped with a 3,000 molecular weight cut-off (MWCO) membrane; (iii) reducing the oxidized product by the addition of sodium borohydride and, after allowing the reaction mixture to stand for 3 to about 4 hours at a temperature ranging from about 4° C. to about 10° C., adjusting the pH of the reaction mixture to a pH of about 3.0 to about 4.0 with HCl to destroy excess borohydride and then increasing the pH of the reaction mixture to a pH of 6.0 to about 7.0 by the addition of NaOH; (iv) dialyzing the resultant product extensively against distilled water; and (v) recovering the product by lyophilization. This process may optionally include the additional step of passing the product over an ATIII affinity chromatography column (i.e., a solid phase to which ATIII has been immobilized), and recovering the effluent which has reduced affinity for ATIII.

The LA-LMW-heparins prepared using the processes of the present invention will preferably exhibit one or more of the following characteristics: (i) an average molecular weight of between about 3,000 and about 8,000 Daltons; (ii) a heparin cofactor II (HCII) specific activating activity against heparin cofactor II of about 2 to about 5 units/mg in an antifactor IIa (thrombin) assay; (iii) an antithrombin III (ATIII) specific activating activity against factor Xa of about 0.2 to about 1.5 units/mg in an antifactor Xa assay; (iv) a solubility in aqueous media ranging from about 0.1 to about 1,000 mg/ml; (v) a uronic acid residue or other native, nonreducing sugar as one end group and a 2,5-anhydromannitol nonreducing sugar as the other end group; and (vi) about 30% of the uronic acid residues are in open-ring form, and substantially free of aldehyde groups. In a presently preferred embodiment, the LA-LMW-heparins of the present invention will exhibit all of the foregoing characteristics.

As a result of the foregoing characteristics, the LA-LMW-heparins prepared using the processes of the present invention are capable of inactivating thrombin bound to fibrin within a thrombus or clot, whereby the ability of clot-bound thrombin to catalytically promote further clot accretion is substantially diminished or eliminated. As such, the LA-LMW-heparins are particularly useful for preventing thrombosis in the circuit of cardiac bypass apparatus and in patients undergoing renal dialysis, and for treating patients suffering from or at risk of suffering from thrombus-related cardiovascular conditions, such as unstable angina, acute myocardial infarction (heart attack), cerebrovascular accidents (stroke), pulmonary embolism, deep vein thrombosis, arterial thrombosis, and related pathologies.

Other features, objects and advantages of the invention and its preferred embodiments will become apparent from the detailed description which follows.

DEFINITIONS

Figure 1:
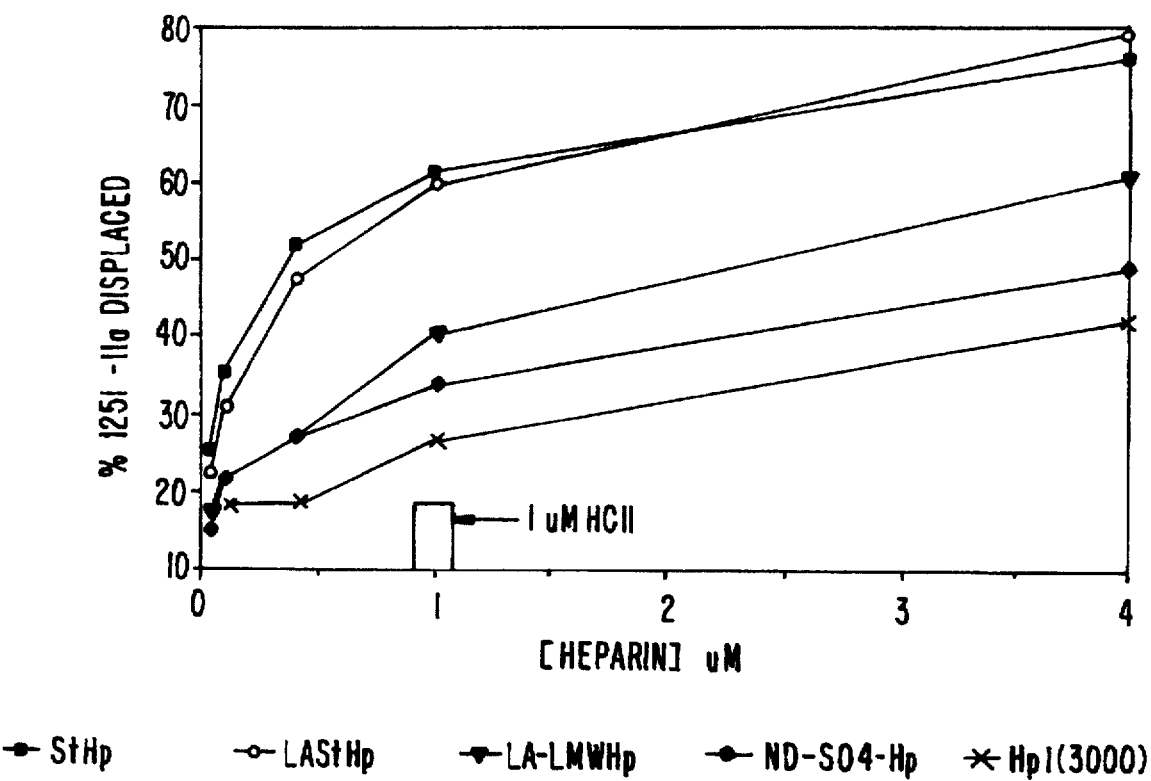
FIGS. 1 and 2 show the mean results of a series of experiments comparing the relative ability of various heparins and a HCII-specific catalytic agent, i.e., LA-LMWH, to inhibit and displace thrombin from fibrin using a filter-containing plate assay. There is a dose response for both displacement and inactivation with 85% inactivation and about 60% displacement at 4 µM. Analysis of gels performed on the displaced thrombin and the residual inactivated fibrin-bound thrombin indicates that HCII is covalently bound to the thrombin, indicating that the thrombin is permanently inactivated.

The use of certain terms in this specification preferably includes reference to the products or techniques defined below in relation to those terms.

"Proteoglycan." as used herein. includes reference to a protein to which is attached one or more glycosaminoglycan chains. Proteoglycans are polyanionic compounds that have properties that reflect both the protein and the glycosaminoglycan chains.

"Glycosaminoglycan." as used herein. includes reference to a polysaccharide composed of repeating disaccharide units. The disaccharides always contain an amino sugar (i.e., glucosamine or galactosamine) and one other monosaccharide. which may be a uronic acid (i.e., glucuronic acid or iduronic acid) as in hyaluronic acid, heparin, heparan sulfate, chondroitin sulfate or dermatan sulfate—or a galactose as in keratan sulfate. The glycosaminoglycan chain may be sulfated on either moiety of the repeating disaccharide.

"Heparin" (or, interchangeably, "standard heparin" (SH) or "unmodified heparin"), as used herein, includes reference to a mixture of glycosaminoglycan chains composed of repeating disaccharides made up of a uronic acid residue (D-glucuronic acid or L-iduronic acid) and a D-glucosamine acid residue. Many of these disaccharides are sulfated on the uronic acid residues and/or the glucosamine residue. Generally, heparin has an average molecular weight ranging from about 6,000 Daltons to 40,000 Daltons, depending on the source of the heparin and the methods used to isolate it. The structural formula of the repeating disaccharide units of heparin is generally as follows:

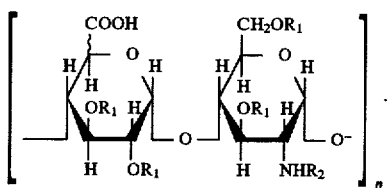

In the above Hayworth formula convention, the "squiggle" bond at C5–C6 of the uronic acid indicates that the uronic acid may be either D-glucuronic acid (carboxyl up) or L-iduronic acid (carboxyl down). In addition, $R_1$ may be either H or $SO_3$, and $R_2$ may be H, Ac (acetyl) or $SO_3$.

"Low Molecular Weight Heparin" (LMWH), as used herein, includes reference to a heparin preparation having an average molecular weight of about 3,000 Daltons to about 8,000 Daltons.

"Low Affinity Heparin" (LAH) (or, interchangeably, "low affinity standard heparin" (LASH)), as used herein, includes reference to a heparin preparation which binds to antithrombin III (ATIII) with an affinity of about $10^{-6}$ M, preferably weaker than about $10^{-5}$ M.

"Low Affinity-Low Molecular Weight Heparin" (LA-LMWH), as used herein, includes reference to a heparin preparation having a molecular weight of about 3,000 Daltons to about 8,000 Daltons and which binds to ATIII with an affinity of about $10^{-6}$ M, preferably weaker than about $10^{-5}$ M. The LA-LMWH preparation can be a mixture of heparin molecules having average molecular weights ranging from about 3,000 to about 8,000 Daltons. This mixture of LA-LWMH molecules is generally referred to herein as V-18 or, interchangeably, as L-18. Alternatively, the mixture of heparin molecules can be separated into its various components using, for example, size exclusion chromatography. The LA-LWMH mixture can be arbitrarily separated into three LA-LWMH fractions by size exclusion chromatography. Fraction 1 has an average molecular weight of about 8,000 Daltons. Fraction 2 has an average molecular weight of about 5,000 Daltons, and Fraction 3 has an average molecular weight of about 3,000 Daltons.

"Heparan Sulfate" (HS), as used herein, includes reference to a glycosaminoglycan which contains a disaccharide repeat unit similar to that of heparin, but which has more N-acetyl groups, fewer N-sulfate groups, and a lower degree of O-sulfate groups.

"Dermatan Sulfate" (DS), as used herein, includes reference to a heterogeneous glycosaminoglycan mixture that contains disaccharide repeat units consisting of N-acetyl-D-galactosamine and D-glucuronic acid, as well as disaccharide repeat units consisting of N-acetyl-D-galactosamine and L-iduronic acid. The uronic acids are present with variable degrees of sulfation.

"Hirudin." as used herein, includes reference to an antithrombin substance that is extracted from the salivary glands of leeches. "Hirulog," as used herein, includes reference to a small, synthetic analog of hirudin.

"Monosaccharide." as used herein, refers a polyhydroxy alcohol containing either an aldehyde or a ketone group, i.e., a simple sugar. Monosaccharide includes reference to naturally occurring simple sugars as well as simple sugars which have been chemically modified. Modified monosaccharides include, but are not limited to, monosaccharides that have increased or decreased sulfation or which have modified carboxyl, amino or hydroxyl groups. Monosaccharides may be chemically modified by: N-desulfation (see, e.g., Inoue, Y., et al., *Carbohydrate Res.* 46, pp. 87–95 (1976)); N-resulfation (see, e.g., Lloyd, A. G., et al., *Biochem. Pharmacol.* 20, pp. 637–648 (1971)), N-acetylation (see, e.g., Danishefsky, I., et al., *Biophys.* 90, pp. 114–121 (1970)); N-succinylation (see e.g., Nagasawa, K., et al., *J. Biochem.* 81, pp. 989–993 (1977)); N-deacetylation (see, e.g., Dimitriev, B. A., et al., *Carbohydr. Res.* 40, pp. 365–372 (1975)); O-desulfation (see, e.g., Jacobson, L., et al., *J. Biol. Chem.* 255, pp. 5084–5100 (1980); carboxy reduction; methylation of free hydroxyl or amino groups; deamination to yield anhydromannose as is done in the present invention, etc.

"Polysaccharide." as used herein, refers a linear or branched polymer of more than 10 monosaccharides that are linked by means of glycosidic bonds.

"Polyanion," as used herein, refers a molecule that possesses a large number of negative charges. "Polyanionic carbohydrates," as used herein, includes reference to carbohydrates that possess a large number of negative charges.

A "heparin additive," as used herein, includes reference to heparin or a heparin-like compound which is mixed with an agent of the present invention prior to patient administration. In a presently preferred embodiment, the heparin additive is either unfractionated heparin or the lowest third molecular weight fraction isolated from unfractionated heparin (LMWH).

"Vicinal alcohol groups," as used herein, includes reference to two hydroxyl groups on adjacent carbon atoms. More particularly, "vicinal alcohol groups" is used herein to refer to the two hydroxyl groups on the C2 and C3 carbon atoms of the uronic acids in the heparin preparations of the present invention.

"Oxidizing agent" or, interchangeably, "oxidant," as used herein, includes reference to a substance that (1) yields oxygen readily, (2) removes hydrogen from a compound, or (3) attracts negative electrons. Suitable oxidizing reagents include, but are not limited to, sodium periodate and, under reaction conditions known to those of skill in the art, lead tetraacetate.

"Reducing agent" or, interchangeably, "reducer," as used herein, includes reference to a substance that is readily oxidized by reducing another substance. Suitable reducing agents include, but are not limited to, sodium borohydride, other metal hydrides and, under reaction conditions known to those of skill in the art, lithium aluminum hydride.

"Affinity," as used herein, is expressed in terms of the dissociation constant ($K_d$). As such, each time an affinity is mentioned, it is referring to the $K_d$, not the $K_a$.

"A clinically unsafe increase in systemic bleeding," as used herein, includes, in preferred embodiments, reference to an activated clotting time of less than 400 seconds and a thrombin clotting time of less than 100 seconds even when the agent is used at the highest effective concentrations.

The "antifactor IIa assay," as used herein, is an HCII catalytic assay that is carried out as follows: a fixed amount of human thrombin (factor IIa) is added to plasma containing a chromogenic synthetic thrombin substrate. After incubation with the compound of interest plus HCII, the amount of residual thrombin activity is determined by measuring the absorbance at 405 nm.

The "antifactor Xa assay," as used herein, is an ATIII catalytic assay that is carried out as follows: a fixed amount of factor Xa is added to plasma containing a chromogenic synthetic factor Xa substrate. After incubation with the compound of interest plus ATIII, the amount of residual factor Xa activity is determined by measuring the absorbance at 405 nm.

DETAILED DESCRIPTION OF THE INVENTION AND PREFERRED EMBODIMENTS

The present invention provides processes for the preparation of low affinity, low molecular weight heparins ("LA-LMW-heparins"), the processes generally comprising: (1) depolymerising unfractionated heparin to yield low molecular weight heparin (LMWH); (2) oxidizing the resultant LMWH to open the ring structures of the nonsulfated uronic acid moieties; and (3) reducing the oxidized LMWH to reduce the aldehydes (to alcohols) formed during the depolymerization and oxidation steps. It has been discovered that by carrying out the foregoing process in the recited order (i.e., depolymerization, followed by oxidation, followed by reduction), LA-LMW-heparins are obtained having unexpected and surprisingly superior pharmacological and therapeutic properties.

In the first step of the above process, unfractionated or standard heparin is depolymerized to yield low molecular weight heparin. Unfractionated heparin is a mixture of polysaccharide chains composed of repeating disaccharides made up of a uronic acid residue (D-glucuronic acid or L-iduronic acid) and a D-glucosamine acid residue. Many of these disaccharides are sulfated on the uronic acid residues and/or the glucosamine residue. Generally, unfractionated heparin has an average molecular weight ranging from about 6,000 Daltons to 40,000 Daltons, depending on the source of the heparin and the methods used to isolate it. The unfractionated heparin used in the process of the present invention can be either a commercial heparin preparation of pharmaceutical quality or a crude heparin preparation, such as is obtained upon extracting active heparin from mammalian tissues or organs. The commercial product (USP heparin) is available from several sources (e.g., SIGMA Chemical Co., St. Louis, Mo.), generally as an alkali metal or alkaline earth salt (most commonly as sodium heparin). Alternatively, the unfractionated heparin can be extracted from mammalian tissues or organs, particularly from intestinal mucosa or lung from, for example, beef, porcine and sheep, using a variety of methods known to those skilled in the art (see, e.g., Coyne, Erwin, *Chemistry and Biology of Heparin*, (Lundblad, R. L., et al. (Eds.), pp. 9–17, Elsevier/North-Holland, New York (1981)). In a presently preferred embodiment, the unfractionated heparin is porcine intestinal heparin.

The unfractionated heparin is depolymerized by contacting unfractionated heparin, under controlled conditions, to the actions of a chemical agent, more particularly, nitrous acid. The nitrous acid can be added to the heparin directly or, alternatively, it can be formed in situ. To generate the nitrous acid in situ, controlled amounts of an acid are added to a derivative of nitrous acid. Suitable acids include those which advantageously contain biologically acceptable anions, such as acetic acid and, more preferably, hydrochloric acid. Suitable derivatives of nitrous acid include a salt, an ether-salt or, more preferably, an alkali or alkaline-earth salt. In a presently preferred embodiment, a salt of nitrous acid, a water-soluble salt, more preferably, an alkali salt, such as sodium nitrite ($NaNO_2$), is used.

The depolymerization of unfractionated heparin is preferably carried out in a physiologically acceptable medium, thereby eliminating the problems associated with the use of a solvent which can be detrimental to the contemplated biological applications. Such physiologically acceptable media include, but are not limited to, water and water/alcohol mixtures. In a presently preferred embodiment, water constitutes the preferred reaction medium. In carrying out the depolymerization reaction, it is desirable to use stoichiometric amounts of the reagents (e.g., nitrous acid). The use of stoichiometric amounts of nitrous acid will ensure that when the desired degree of depolymerization is reached, the nitrous acid is entirely consumed. Typically, the weight ratio of unfractionated heparin to sodium nitrite ($NaNO_2$) ranges from about 100 to 2–4 and, more preferably, from about 100 to 3. Using a stoichiometric amount of nitrous acid avoids the need to "quench" a kinetic (ongoing) reaction with, for example, ammonium sulfamate and, in turn, prevents the formation of mixed salts (e.g., sodium and ammonium) of the LMW-heparin intermediates.

In addition, other parameters, such as temperature and pH, are adjusted with respect to one another in order to obtain the desired products under the most satisfactory experimental conditions. For instance, the depolymerization reaction can be carried out at temperatures ranging from about 0° to 30° C. In fact, temperatures lower than 10° C. can be used for the production of the desired products. However, in a preferred embodiment, the depolymerization reaction is carried out at ambient temperature, i.e., between about 20° C. and 28° C. Moreover, in a preferred embodiment, the depolymerization reaction is initiated and terminated by first lowering and then raising the pH of the reaction mixture. To initiate the depolymerization reaction, the pH of the reaction mixture is lowered to a pH of about 2.5 to 3.5 and, more preferably, to a pH of about 3.0. Similarly, to terminate the depolymerization reaction, the pH of the reaction mixture is raised to a pH of about 6.0 to 7.0 and, more preferably, to a pH of about 6.75. It should be noted that the progress of the reaction can be monitored by checking for the presence or absence of nitrous ions in the reaction mixture using, for example, starch-iodine paper. The absence of nitrous ions in the reaction mixture indicates that the reaction has gone to completion. The time required for the reaction to reach completion will vary depending on the reactants and reaction conditions employed. Typically, however, the reaction will reach completion in anywhere from about 1 hr to about 3 hr.

Once the reaction has reached completion, the LMW-heparin can be recovered using a number of different techniques. In one embodiment, the LMW-heparin is recovered from the reaction mixture by precipitation, ultrafiltration or chromatography methods. If the desired product is obtained by precipitation, this is generally done using, for example, an alcohol (e.g., absolute ethanol). In a presently preferred embodiment, the low molecular weight heparin is recovered from the reaction mixture using ultrafiltration methods. Ultrafiltration membranes of various molecular weight cuts-offs can advantageously be used to both desalt and define the molecular weight characteristics of the resulting LMW-heparin. Ultrafiltration systems suitable for use in the processes of the present invention are known to and used by those of skill in the art. The commercially available Millipore Pellicon ultrafiltration device is an exemplary ultrafiltration system which is suitable for use in the processes of the present invention. This device can be equipped with various molecular weight cut-off membranes. In a presently preferred embodiment, the resulting LMWH is dialyzed or ultrafiltered against purified water (i.e., distilled water ($dH_2O$)) using a Millipore Pellicon ultrafiltration device equipped with 3,000 Dalton molecular weight cut-off membranes.

After ultrafiltration, the retentate is then lyophilized, i.e., freeze-dried, to give LMW-heparin. The molecular weight characteristics of the resulting LMW-heparin can be determined using standard techniques known to and used by those of skill in the art. In a preferred embodiment, the molecular weight characteristics of the resulting LMW-heparin is determined by high performance size exclusion chromatography in conjunction with multiangle laser light scattering (HPSEC-MALLS). Typically, the resulting LMW-heparin has a weight average (Mw) of between about 3,000 to about 8,000 Daltons.

In the second step of the above process, LMW-heparin is oxidized to open the ring structures of the nonsulfated uronic acid moieties. More particularly, the oxidation reaction cleaves the vicinal, i.e., C2–C3, bond of a critical nonsulfated glucuronic acid residue found within the heparin pentasaccharide sequence for ATIII. Cleavage of this bond markedly reduces the affinity of heparin and LMWH for ATIII. In this step, LMW-heparin is dissolved in water, preferably distilled water, at a temperature ranging from about 4° C. to about 10° C. to form an aqueous solution of LMW-heparin. The aqueous solution is adjusted to a pH of between about 4.5 and 6.5 and, more preferably, to a pH of about 5. Thereafter, the aqueous solution of LMW-heparin is treated with a salt of periodic acid. In a presently preferred embodiment, the salt of periodic acid is sodium periodate. In this step, the LMW-heparin is generally present at a concentration ranging from about 1% (wt/v) to about 5% (wt/v), whereas the salt of periodic acid (e.g., sodium periodate) is present at a concentration ranging from about 2% (wt/v) to about 4% (wt/v).

Once the sodium periodate has been added, the solution is left to stand, with gentle stirring, at a temperature ranging from 0° C. to about 10° C. and, more preferably, at about 6° C. in the absence of light. Typically, the solution is left to stand in the dark for about 15 to about 96 hours and, more preferably, for about 72 hours. When the oxidation reaction is completed, the excess sodium periodate is destroyed (i.e., converted to $NaIO_3$) by the addition of, for example, glycerol or ethylene glycol. In a presently preferred embodiment, glycerol is used to destroyed the excess sodium periodate. Thereafter, the pH of the solution is raised to about 7.0, and the oxidized, LMW-heparin can be recovered from the reaction mixture using any of a number of different methods, including precipitation, ultrafiltration or chromatography methods. As with the LMW-heparin, the oxidized LMW-heparin is preferably recovered from the reaction mixture using ultrafiltration methods which serve both to desalt and refine the molecular weight characteristics of the resulting oxidized, LMW-heparin. In a particularly preferred embodiment, the resulting oxidized, LMW-heparin is dialyzed or ultrafiltered against purified water (i.e., distilled water ($dH_2O$)) using a Millipore Pellicon ultrafiltration device equipped with 3,000 Dalton molecular weight cut-off membranes. After ultrafiltration, the retentate is concentrated to yield the desired oxidized, LMW-heparin.

In the third step of the above process, the oxidized, LMW-heparin is reduced. More particularly, the oxidized, LMW-heparin is subjected to a reduction step in order to convert the aldehyde groups (to alcohols) resulting from the cleavage of the vicinal bond between the carbon atoms $C_2$ and $C_3$ of the nonsulfated uronic acid residues. In this step, an aqueous solution of the oxidized, LMW-heparin is reduced using a reducing agent, such as sodium or potassium borohydride. In a presently preferred embodiment, sodium borohydride is the reducing agent employed. Typically, the oxidized, LMW-heparin is present at a concentration ranging from about 1% (wt/v) to about 5% (wt/v), whereas the reducing agent (e.g., sodium borohydride) is present at a concentration ranging from about 0.4% (wt/v) to about 1% (wt/v). Once the reducing agent has been added to the aqueous solution of oxidized, LMW-heparin, the reaction mixture is kept at a temperature of about 4° C. to about 10° C. for a period of about 2.0 to 6.0 hours and, more preferably, for a period of about 3 hours. Thereafter, the unreacted reducing agent is destroyed by lowering the pH of the reaction mixture to a pH of about 4.0 by means of an acid, such as hydrochloric acid, and stirring for about 15 to about 60 minutes.

As with the previous two steps, the resulting product, i.e., the reduced, LMW-heparin, can be recovered from the reaction mixture using any of a number of different methods, including precipitation, ultrafiltration or chromatography methods. In a presently preferred embodiment, the reduced, LMW-heparin is preferably recovered from the reaction mixture using ultrafiltration methods which serve both to desalt and refine the molecular weight characteristics of the resulting oxidized and reduced LMW-heparin. In a particularly preferred embodiment, the resulting reduced, LMW-heparin is dialyzed or ultrafiltered against purified water (i.e., distilled water (dH$_2$O)) using a Millipore Pellicon ultrafiltration device equipped with 3,000 Dalton molecular weight cut-off membranes. After ultrafiltration, the retentate is then sterile filtered and lyophilized, i.e., freeze-dried, to give LA-LMW-heparin.

Those of skill in the art will readily appreciate that the resulting LA-LMW-heparin can be subjected to further purification procedures. Such procedures include, but are not limited to, gel permeation chromatography, ultrafiltration, hydrophobic interaction chromatography, affinity chromatography, ion exchange chromatography, etc. In a presently preferred embodiment, the resulting LA-LMW-heparin is further purified using affinity chromatography. In this embodiment, the resulting product is passed over a solid phase to which ATIII has been immobilized, and the effluent, which has reduced affinity for ATIII, is retained. It is believed that the reduction in molecular size together with the reduction in ATIII activating activity endows the resulting LA-LMW-heparins with their ability to inactivate clot-bound thrombin selectively with only minimal inactivation of free thrombin.

The molecular weight characteristics of the LA-LMW-heparin prepared using the above method can be determined using standard techniques known to and used by those of skill in the art. In a preferred embodiment, the molecular weight characteristics of the resulting LA-LMW-heparin are determined by high performance size exclusion chromatography in conjunction with multiangle laser light scattering (HPSEC-MALLS). Typically, the resulting LA-LMW-heparin is a mixture of heparin molecules having weight average (Mw) molecular weights ranging from about 3,000 Daltons to about 8,000 Daltons. This mixture of materials can be used directly or, alternatively, it can be separated into its various components using, for example, size exclusion chromatography. For instance, the LMWH mixture can be arbitrarily separated into three fractions by size exclusion chromatography. Fraction 1 has an average molecular weight of about 8,000 Daltons, Fraction 2 has an average molecular weight of about 5,000 Daltons, and Fraction 3 has an average molecular weight of about 3,000 Daltons. It has been discovered that these three fractions have properties which are distinct from each other as well as from the mixture of materials, i.e., the mixture of heparin molecules having molecular weights ranging from about 3,000 Daltons to about 8,000 Daltons. Thus, depending on whether the mixture of materials, Fraction 1, Fraction 2, Fraction 3 or various combinations of these materials are used, one can take advantage of different properties.

The LA-LMW-heparins prepared using the processes of the present invention are capable of selectively inactivating clot-bound thrombin. More particularly, the processes of the present invention provides LA-LMW-heparins capable of selectively inactivating thrombin which is bound either to fibrin in a clot or to some other surface, but which have only minimal inhibitory activity against free thrombin. The selective activity of such LA-LMW-heparins allows them to inactivate fibrin-bound thrombin in a patient at concentrations which produce minimal inactivation of free thrombin, thereby diminishing the risk of bleeding. Preferably, the inactivation of fibrin- or surface-bound thrombin is essentially irreversible so that clot accretion will not substantially resume after such HCII-specific catalytic agents (i.e., activating agents which activate, catalyze or induce HCII mediated inactivation of fibrin-bound thrombin) are cleared from the blood.

As a result of the processes used for their preparation, the LA-LMW-heparins have been modified so that they contain less than about 5% and, more preferably, less than about 3% of the antithrombin III (ATIII) catalyzing activity or, interchangeably, activating activity of unmodified LMWH or standard heparin, but more residual ATIII activating activity than dermatan sulfate. Moreover, because of their reduced chain length compared to standard heparin, the LA-LMW-heparins have much less activity as catalysts of HCII-mediated inactivation of free thrombin than either standard heparin or dermatan sulfate. As such, the LA-LMW-heparins have very weak activity when assayed against free thrombin in a thrombin clotting time assay and would not have been predicted to be effective antithrombotic agents. Quite surprisingly, however, the low affinity, low molecular weight heparins are able to effectively catalyze HCII-mediated inactivation of surface-bound thrombin, e.g., fibrin-bound thrombin or, interchangeably, clot-bound thrombin.

Surface-bound thrombin is typically inactivated through the formation of a covalent, irreversible thrombin-HCII complex. Thus, in contrast to typical antithrombins and other anticoagulants (e.g., dermatan sulfate, heparin, low molecular weight heparins (LMWHs), hirudin and other direct thrombin inhibitors), the LA-LMW-heparins have the ability to selectively and, preferably, irreversibly inactivate fibrin-bound thrombin without having major inhibitory effects against fluid-phase (free) thrombin. Without being bound to a given theory, this ability is explained by the observation that the LA-LMW-heparins prepared using the processes of the present invention produce a conformational change upon binding to HCII which enables it to bind and inactivate thrombin effectively when the thrombin enzyme is immobilized on a surface, but which lacks the size to bind and inhibit thrombin effectively when it is free in the fluid phase.

The LA-LMW-heparins prepared using the processes of the present invention will preferably exhibit one or more of the following characteristics: (i) a weight-average (Mw) molecular weight of between about 3,000 and about 8,000 Daltons; (ii) a heparin cofactor II specific activity against heparin cofactor II of about 2 to about 5 units/mg in an antifactor IIa (thrombin) assay; (iii) an antithrombin III (ATIII) specific activity against factor Xa of about 0.2 to about 1.5 units/mg in an antifactor Xa assay; (iv) a solubility in aqueous media ranging from about 0.1 to about 1,000 mg/ml; and (v) a uronic acid residue or other native, nonreducing sugar as one end group and a 2,5-anhydromannitol nonreducing sugar as the other end group. In a presently preferred embodiment, the LA-LMW-heparins of the present invention will exhibit all of the foregoing characteristics.

Moreover, in one embodiment, the LA-LMW-heparin can have the following formula:

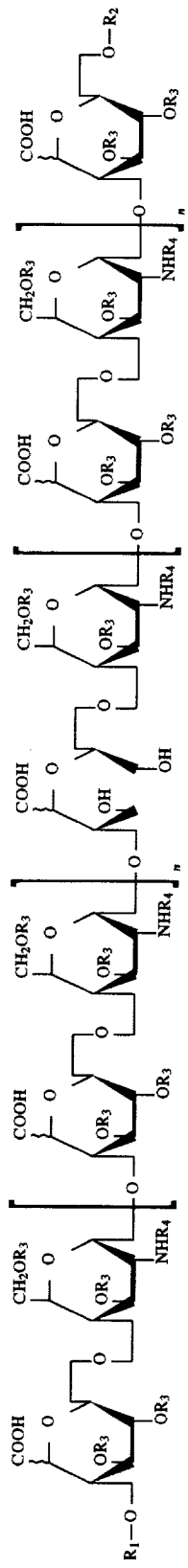

In the above formula, $R_1$ is a member selected from the group consisting of H and D-glucosamine acid residue. $R_2$ is a member selected from the group consisting of H, D-glucosamine acid residue and anhydromannitol. $R_3$, in the above formula, is a member selected from the group consisting of H and $SO_3$—. Finally, $R_4$ is a member selected from the group consisting of H, $SO_3$— and —$COCH_3$. In the above formula, indexes "n" are independently selected and can have values ranging from 0 to about 14. The values of "n" are selected such that the HCII-specific catalytic agents of the present invention will have weight-average (Mw) molecular weights ranging from about 3,000 Daltons to about 8,000 Daltons.

In another embodiment, the LA-LMW-heparin can have the following formula:

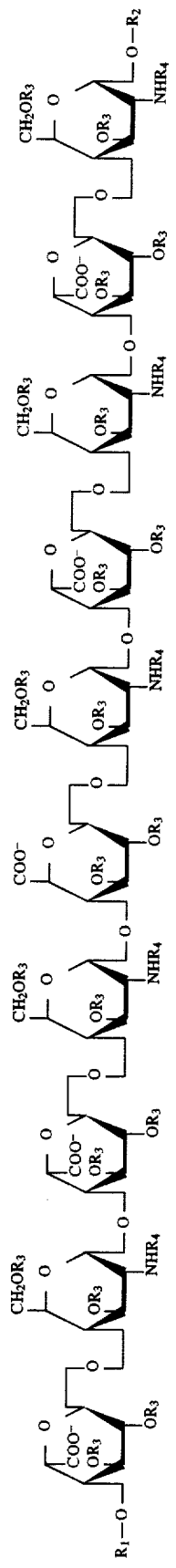

In the above formula, $R_1$ and $R_2$ are members independently selected from the group consisting of H and D-glucosamine acid residue. $R_3$, in the above formula, is a member selected from the group consisting of H and $SO_3$—. Finally, $R_4$ is a member selected from the group consisting of H, $SO_3$— and —$COCH_3$. In the above structure, sequences having the heparin pentasaccharide sequence for ATIII have been substantially removed by ATIII affinity chromatography. As mentioned, the HCII catalytic agents of the present invention will typically have weight-average (Mw) molecular weights ranging from about 3,000 Daltons to about 8,000 Daltons.

The LA-LMW-heparins prepared using the processes of the present invention are capable of inactivating thrombin bound to fibrin within a thrombus or clot, whereby the ability of clot-bound thrombin to catalyze further clot accretion is substantially diminished or eliminated. As such, the low affinity, low molecular weight heparins are particularly useful for preventing thrombosis in the circuit of cardiac bypass apparatus and in patients undergoing renal dialysis, and for treating patients suffering from or at risk of suffering from thrombus-related cardiovascular conditions, such as unstable angina, acute myocardial infarction (heart attack), cerebrovascular accidents (stroke), pulmonary embolism, deep vein thrombosis, arterial thrombosis, etc. However, such LA-LMW-heparins are not limited to such uses, and they may find use in other in vitro and in vivo situations whenever it is desirable to inhibit clot or thrombus accretion, or to promote clot or thrombus solubilization. For example, the compositions of the present invention may be used as an anticoagulant for inhibiting thrombin-induced clotting in various in vitro studies, assays and the like.

The LA-LMW-heparins can be used in various methods, for example, to modify thrombus formation in a patient without inducing a clinically unsafe increase in systemic bleeding. Quite importantly, the low affinity, low molecular weight heparins can be administered in doses which inactivate surface-bound thrombin, but which have only small effects at inhibiting free thrombin. When the low affinity, low molecular heparins are used for inhibiting thrombus formation in a patient, preferably without inducing a clinically unsafe increase in systemic bleeding, a pharmacologically acceptable dose of the low affinity, low molecular heparin is administered to the patient, the LA-LMW-heparin being characterized by: (i) a heparin cofactor II specific activity against heparin cofactor II of about 2 to about 5 units/mg in an antifactor IIa (thrombin) assay; (ii) an anti-thrombin III (ATIII) specific activity against factor Xa of about 0.2 to about 1.5 units/mg in an anti-factor Xa assay; and (iii) a solubility in aqueous media ranging from about 0.1 to about 1,000 mg/ml.

The LA-LMW-heparins prepared using the processes of the present invention are effective when used alone or, alternatively, when used with low doses of heparin or low molecular weight heparin which are required to inactivate free thrombin. In heparin-resistant conditions (i.e., disorders requiring very high doses of heparin), for example, the LA-LMW-heparin of the present invention can be used as a heparin-sparing agent. As such, combinations and, preferably, blends of LA-LMW-heparin and an ATIII catalytic agent, i.e., an ATIII activating agent, can be formed. ATIII catalytic or activating agents suitable for use in the blends of the present invention include, but are not limited to, heparin and LMWH. In addition, other agents can be added as desired to modify the blend, including, for example, LMWH (0.1 to 5 wt %), heparin (0.1 to 5 wt %), direct thrombin inhibitors, direct inhibitors of activated factor X, etc.

Such blends are useful for inhibiting thrombogenesis in a patient without substantially inhibiting normal coagulation. Thus, the compositions or blends of the present invention are useful for inhibiting thrombus formation in a patient without inducing a clinically unsafe increase in systemic bleeding. In addition, such compositions or blends are useful for prophylaxis, for the treatment of venous or arterial thrombosis and for the prevention of clotting in extracorporeal circuits. Such blends will typically be from about 90 to about 99.9 percent by weight of LA-LMW-heparin and, more preferably, from about 95 to about 98.5 percent by weight; and from about 0.1 to about 10 percent by weight of an ATIII catalytic agent, i.e., an ATIII activating agent and, more preferably, from about 0.5 to about 5 percent by weight. Typically, the overall HCII catalyst activity of the blends will be about 2 to about 5 units/mg and, more preferably, about 2 to about 4 units/mg.

The LA-LMW-heparins and blends thereof can be incorporated as components in pharmaceutical compositions which are useful for treating the cardiovascular conditions described above. Such compositions will also be useful in conjunction with conventional thrombolytic treatments, such as the administration of tissue plasminogen activator (tPA), streptokinase, and the like, as well as with intravascular intervention, such as angioplasty, atherectomy, and the like. Suitable pharmaceutical compositions will contain a therapeutically effective dose of LA-LMW-heparin in a pharmaceutically acceptable carrier. Other suitable pharmaceutical compositions will contain a therapeutically effective dose of a blend of LA-LMW-heparin and an ATIII-specific catalytic agent. By a "therapeutically effective dose" or, interchangeably, "pharmacologically acceptable dose," it is meant that a sufficient amount of the LA-LMW-heparin or, alternatively, a combination or blend of a LA-LMW-heparin and an ATIII-specific catalytic agent will be present in order to inactivate clot-bound thrombin and/or to inhibit thrombus accretion when treating a thrombus-related cardiovascular condition, such as those described above.

Typically, the LA-LMW-heparin will be present in the pharmaceutical composition at a concentration ranging from about 200 mg per dose to 2 g per dose and, more preferably, at a concentration ranging from about 500 mg per dose to 1 g per dose. Daily dosages can vary widely, depending on the activity of the particular HCII-specific catalytic agent employed, but will usually be present at a concentration ranging from about 30 µg per kg of body weight per day to about 500 µg per kg of body weight per day and, more preferably, at a concentration ranging from about 50 µg per kg of body weight per day to about 200 µg per kg of body weight per day.

With respect to the combined or blended pharmaceutical compositions, the LA-LMW-heparin will be present at a concentration ranging from about 3 mg/kg per dose to about 30 mg/kg per dose and, more preferably, at a concentration ranging from about 3 mg/kg per dose to 10 mg/kg per dose, and the ATIII catalytic agent, i.e., the ATIII activating agent, will be present at a concentration ranging from about 10 U/kg per dose to 500 U/kg per dose and, more preferably, at a concentration ranging from about 15 U/kg per dose to 100 U/kg per dose. Daily dosages can vary widely, depending on the activity of the LA-LMW-heparin and ATIII catalytic (i.e., activating) agent employed. Typically, the LA-LMW-heparin will usually be present at a concentration ranging from about 3 mg per kg of body weight per day to about 30 mg per kg of body weight per day and, more preferably, at a concentration ranging from about 3 mg per kg of body weight per day to about 10 mg per kg of body weight per day, whereas the ATIII catalytic agent will usually be present at a concentration ranging from about 10 U per kg of body weight per day to about 500 U per kg of body weight per day and, more preferably, at a concentration ranging from about 15 U per kg of body weight per day to about 100 U per kg of body weight per day.

The pharmaceutically acceptable carrier can be any compatible, nontoxic substance suitable to deliver the LA-LMW-heparin or the blend of low affinity, low molecular heparin and an ATIII-specific catalytic agent to the patient. Sterile water, alcohol, fats, waxes, and inert solids can be used as the carrier. Pharmaceutically acceptable adjuvants, buffering agents, dispersing agents, and the like can also be incorporated into the pharmaceutical compositions. Such compositions will be suitable for oral, nasal, respiratory or parenteral administration, preferably being suitable for parenteral administration, i.e., subcutaneous, vascular and intravenous administration. It may also be preferred to deliver the substances provided by the present invention via transdermal administration.

In view of the foregoing, it is readily apparent to those of skill in the art that the LA-LMW-heparins prepared using the processes of the present invention can effectively be used to selectively inhibit clot- or fibrin-bound thrombin without inducing a clinically unsafe increase in systemic bleeding. In addition, such low affinity, low molecular heparins can effectively be used in combination with other ATIII catalytic or activating agents (e.g., heparin or LMWH) to inhibit both clot-bound thrombin and fluid-phase (free) thrombin without inducing a clinically unsafe increase in systemic bleeding. As such, the LA-LMW-heparins of the present invention can be used alone, or in combination with other ATIII catalytic agents to treat a number of important cardiovascular complications, including unstable angina, acute myocardial infarction (heart attack), cerebral vascular accidents (stroke), pulmonary embolism, deep vein thrombosis, arterial thrombosis, etc.

The characteristics of the LA-LMW-heparins of the present invention are more thoroughly described in U.S. patent applications Ser. No. 08/412,332, filed Mar. 31, 1995 now abandoned, Ser. No. 08/540,324, filed Oct. 6, 1995, and Ser. No. 08/624,327, filed Mar. 29, 1996, the teachings of which are hereby incorporated by reference.

The invention will be described in greater detail by way of specific examples. The following examples are offered for illustrative purposes, and are not intended to limit the invention in any manner. Those of skill in the art will readily recognize a variety of noncritical parameters which can be changed or modified to yield essentially the same results.

EXAMPLES

A. Preparation of LA-LMW-Heparin

The following examples illustrate experimental protocols which can be used to prepare the HCII-specific catalytic agents of the present invention. As noted above, in a presently preferred embodiment, the chemical reactions leading to the preparation of the HCII-specific catalytic agents of the present invention are: (1) nitrous acid depolymerization of heparin to yield low molecular weight heparin; (2) periodate oxidation of low molecular weight heparin to open the ring structures of nonsulfated uronic acid moieties; and (3) borohydride reduction of aldehydes (to alcohols) formed during the nitrous acid and periodate steps.

1. Example 1

Preparation of V-18, Lot #7-1 a. Step 1: Isolation of LMW-heparin, Lot #7

Porcine intestinal heparin (250 grams) was dissolved in 5 liters of purified water (5% solution). Sodium nitrite (3.45 grams) was added and dissolved into the solution to give a 10 mM concentration. The solution temperature was between 18 and 24 degrees Celsius. Over the course of about 2 minutes, 30 mls of 37% HCl were added and the pH adjusted from an initial value of 6.32 to a final pH of 3.00. The resultant solution was then stirred for 2 hours at ambient temperature to allow depolymerization to occur. At the end of the 2 hour incubation, the pH was adjusted upwards to a value of 6.75 by slow addition of about 18 mls of 50% NaOH solution.

The sample was then diluted to a volume of 12.5 liters and ultrafiltered against 10 volumes of purified water using a Millipore Pellicon ultrafiltration device equipped with 10,000 molecular weight cut-off membranes (1.5 m$^2$). The permeate from the ultrafiltration was then concentrated and dialyzed using a Millipore Pellicon ultrafiltration unit equipped with 3,000 molecular weight cut-off membranes (1.5 m$^2$). Once the 125 liters of permeate was concentrated to about 6 liters, it was then dialyzed against 3-volumes of purified water. The retentate was then freeze-dried to give LMW-heparin, Lot#7. Yield=106 grams (42%)

Molecular weight characteristics of LMW-heparin intermediate #7 (above) were determined by high performance size exclusion chromatography in conjunction with multi-angle laser light scattering (HPSEC-MALLS) and are compiled in Table 1.

TABLE 1

| HPSEC-MALLS Results for LMW-Heparin Intermediate & V18 Product | | | | | | | |
|---|---|---|---|---|---|---|---|
| Lot: | #7 | #7-1 | #9 | #9-1 | #9-2 | #20 | #20-1 |
| >2,000 | 100[i] | 100 | 99.8 | 100 | 100 | 99.2 | 100 |
| >3,000 | 100 | 100 | 80.4 | 100 | 100 | 76.4 | 77.1 |
| >4,000 | 57.5 | 61.8 | 50.1 | 63.6 | 63.9 | 52.1 | 51.8 |
| >5,000 | 35.0 | 39.9 | 29.9 | 36.2 | 36.4 | 35.5 | 34.2 |
| >6,000 | 22.2 | 25.0 | 18.2 | 20.6 | 20.6 | 24.4 | 22.9 |
| >7,000 | 14.0 | 16.3 | 10.8 | 12.0 | 11.8 | 16.5 | 15.8 |
| >8,000 | 9.2 | 10.5 | 6.4 | 6.5 | 6.5 | 11.6 | 10.9 |
| >9,000 | 4.8 | 7.1 | 3.6 | 3.6 | 3.6 | 7.7 | 7.6 |
| Mw[ii] | 4,989 | 5,228 | 4,583 | 5,022 | 5,024 | 4,920 | 4,876 |
| Mn[iii] | 4,421 | 4,602 | 4,031 | 4,582 | 4,603 | 4,067 | 4,006 |
| Mw/Mn[iv] | 1.129 | 1.136 | 1.137 | 1.096 | 1.091 | 1.210 | 1.217 |

[i]Weight fraction above a given molecular weight, expressed in percent.
[ii]Weight-average molecular weight.
[iii]Number-average molecular weight.
[iv]Polydispersity.

b. Steps 2 and 3: Oxidation and Reduction of LMW-heparin, Lot #7

LMW-heparin, Lot #7 (100 grams) was dissolved in 1 liter of purified water at 4–10 degrees Celsius. One liter (1 liter) of 200 mM sodium acetate, pH 5.0 was added to the dissolved sample. Two liters (2 liters) of 200 mM sodium periodate was added to the buffered LMW-heparin solution. The resultant solution was incubated in the dark at 4–10 degrees C for 48 hours with gentle stirring.

After 48 hours, excess sodium periodate was destroyed by addition of glycerol (70 mls). The pH of the resultant reaction mixture was raised to neutrality with ~10 mls of 50% NaOH solution and the resultant solution diluted to about 5.5 liters. This solution was then dialyzed (ultrafiltered) using the Millipore Pellicon system equipped with 3,000 MWCO membranes (as in Step 1 above). After ~7 volumes of permeate were collected, the oxidized LMW-heparin intermediate solution was concentrated to a volume of ~3 liters.

Reduction of the oxidized intermediate was carried out as follow: Sodium bicarbonate (63 grams) was added and mixed into the above 3 liter solution to give ~0.25M $NaHCO_3$ solution. This solution was kept cold (4°–10° C.) while a solution (1.2 liters) containing 22.8 grams of $NaBH_4$ (also 4°–10° C.) was slowly added with stirring. Once all the $NaBH_4$ solution was added, the reaction was kept at 4°–10° C. for 3.5 hours. The reaction pH was then adjusted to 4.0 with 6N HCl (~230 mls), mixed for ~30 minutes, then adjusted upwards in pH to 6.2 with 50% NaOH addition. This sample was then ultrafiltered again against the 3,000 MWCO membranes using the Millipore Pellicon system (7 volumes) and finally sterile filtered through a 0.2 μm Sterivex (Millipore) filter. The resultant solution was freeze-dried to give V-18, Lot#7-1. Yield=76.6 grams.

Molecular weight characteristics of the product were determined by HPSEC-MALLS and are compiled in Table 1, supra.

2. Example 2

Preparation of V-18, Lots #9-1 and 9-2 a. Step 1: Isolation of LMW-Heparin, Lot# 9

Porcine intestinal heparin (250 grams) was dissolved in 5 liters of purified water (5% solution). Sodium nitrite (8.62 grams) was added and dissolved into the solution to give a 25 mM concentration. The solution temperature was between 18 and 24 degrees Celsius. Over the course of about 2 minutes, 33 mls of 37% HCl were added and the pH adjusted from an initial value of 6.32 to a final pH of 3.01. The resultant solution was then stirred for 2 hours at ambient temperature to allow depolymerization to occur. At the end of the 2 hour incubation, the pH was adjusted upwards to a value of 6.28 by slow addition of 50% NaOH solution.

The sample was then diluted to a volume of 10 liters and ultrafiltered against 7 volumes of purified water using a Millipore Pellicon ultrafiltration device equipped with 3,000 MWCO membranes (1.5 m²). The sample was then concentrated to ~3.5 liters and freeze-dried to give LMW-heparin Lot#9. Yield=120.4 grams (48%)

Molecular weight characteristics of LMW-heparin intermediate #9 were determined by HPSEC-MALLS and are compiled in Table 1, supra.

b. Steps 2 and 3: Oxidation and Reduction of V-18, Lots 9-1 and 9-2

Two identical but separate fifty gram (50 gm) samples of LMW-heparin, Lot #9, were treated as follows: LMW-heparin (50 gm) was dissolved in 500 ml of purified water (4°–10° C.). Sodium acetate buffer (500 mls of 200 mM, pH 5.0) was added to each identical sample. Sodium periodate (1,000 mls of 200 mM solution) was then added to each reaction and the resultant solutions were each incubated in the dark and cold for 72 hours. After the 72 hr. incubation, glycerol (40 mls) was added to each sample to destroy excess periodate. The reaction pH was then raised to ~6.5 for each sample and each ultrafiltered against 7 volumes of purified water using the Pellicon system equipped with 3,000 MWCO membranes.

Reduction of each of the resultant oxidized LMW-intermediates and all other steps in the workup were exactly as indicated for sample 7-1 in Example 1 (above). Yields of V-18, Lots #9-1 and 9-2 were: 37.4 gms and 36.7 gms, respectively.

Molecular weight characteristics of V-18, Lots #9-1 and 9-2 were determined by HPSEC-MALLS and are compiled in Table 1, supra.

3. Example 3

Preparation of V-18, Lot #20-1 a. Step 1: Isolation of LMW-Heparin, Lot #20

Porcine intestinal heparin (500 grams) was dissolved in 10 liters of purified water (5% solution). Sodium nitrate (9.0 grams) was added and dissolved into the solution to give a 12.8 mM concentration. The solution temperature between 18 and 24 degrees Celsius. Over the course of about 2 minutes, 59 mls of 37% HCl were added and the pH adjusted from an initial value of 6.27 to a final pH of 3.00. The resultant solution was then stirred for 2 hours at ambient temperature to allow depolymerization to occur. At the end of the 2 hour incubation, the pH was adjusted upwards to a value of 6.57 by slow addition of about 38 mls of 50% NaOH solution.

The sample was then diluted to a volume of 17 liters and ultrafiltered against 10 volumes of purified water using a Millipore Pellicon II ultrafiltration device equipped with 8,000 molecular weight cut-off membranes (1.5 m²). The permeate from the ultrafiltration was then concentrated and dialyzed using a Millipore Pellicon II ultrafiltration unit equipped with 3,000 molecular weight cut-off membranes (1.5 m²). Once the permeate (170 liters) was concentrated to about 8.5 liters, it was then dialyzed against 7 volumes of purified water. The retentate was then freeze-dried to give LMW-heparin, Lot #20. Yield=171.3 grams (34%).

Molecular weight characteristics of LMW-heparin intermediate #20 (above) were determined by HPSEC-MALLS and are compiled in Table 1, supra.

b. Steps 2 and 3: Oxidation and Reduction of V-18, Lot 20-1

LMW-heparin (170 gms. of Lot #20) was dissolved in 1,700 mls of purified water (4°–10° C.). Sodium acetate buffer (1,700 mls of 200 mH, pH 5.0) was added and mixed with the sample. Sodium periodate (3,400 mls of 200 mM solution) was then added to the mixture to initiate reaction and the resultant solution was incubated in the dark and cold for 72 hours. After the 72 hr. incubation, glycerol (115 mls) was added to destroy excess periodate. The reaction pH was then raised to 6.5 and the oxidized LMW-heparin ultrafiltered against 7 volumes of purified water using the Pellicon II system equipped with 3,000 MWCO membranes.

Reduction of the resultant oxidized LMW-intermediate and all other steps in the workup were comparable to conditions used for sample 7-1 in Example 1 (above). Yield of V-18 Lot#20-1 was 131 gms.

Molecular weight characteristics of V-18 Lot#20-1 were determined by HPSEC-MALLS and are included in Table 1, supra.

4. Example 4

Four Large-Scale Preparations of V-18 of Pharmaceutical Quality a. Step 1A. Nitrous Acid Depolymerization of Heparin All of Steps 1A and 1B were carried out in a controlled-access pilot laboratory maintained at ambient temperature (19°–26° C.). Porcine intestinal heparin (1 Kg) is dissolved in 20 liters of purified water (20° to 26° C.) in a 10 gallon polypropylene drum, using a propeller-type Lightnin mixer at medium speed to affect dissolution (5% solution of heparin).

Minimum specifications for the heparin used are a USP potency greater than 170 Units/mg with less than 1% dermatan sulfate impurity, as measured by galactosamine content. Purified water was prepared by a process involving reverse osmosis and meets all USP monograph standards for purified water.

Once the heparin was visually in solution (15 to 60 minutes), solid sodium nitrite was added to achieve a final concentration of 22.5 mM (31.1 grams of ACS reagent grade sodium nitrite added). This was dissolved using a Lightnin mixer at medium speed (dissolution takes less than 5 minutes). With continued agitation, a calibrated pH electrode was placed in the solution and the initial pH of the solution measured (typically, pH=6.1 to 6.3). The heparin/sodium nitrite solution was then covered with a hooded canopy, agitation continued, and the pH adjusted to 3.0 (±0.1) with 37% HCl (ACS reagent, 125 to 135 mls required). Reaction/agitation was continued for 2 hours with periodic measurement of the pH and temperature. After 2 hours, with continued agitation, the pH was adjusted to between 6.75 (±0.25) with 50% NaOH (diaphragm grade, 80 to 100 mls required). Processing of the resultant crude LMW-heparin mixture was then carried out as described in Step 1B, below.

b. Step 1B. Purification of LMW-Heparin

The 20 liter sample from Step 1A was then diluted with purified water to an initial volume of approximately 36 liters and ultrafiltered (dialyzed) using a Millipore Pellicon II ultrafiltration device. The ultrafiltration unit was outfitted with 1.5 $m^2$ of Pellicon II ultrafiltration membranes (cellulose), with a 3,000 Dalton nominal molecular weight cutoff. The 36 liter sample was ultrafiltered against 7–8 volumes of purified water (20° to 26° C.), with the permeate discarded and the retentate concentrated to a final volume of about 12 liters. Inlet pressures were maintained at 60 (±2) PSI and back pressure was maintained at 52 (±2) PSI. Typical permeate flow-rates during the ultrafiltration were 500 (±50) mls/min. Temperature, flow-rates, pressures, and flux-rates were measured periodically throughout the ultrafiltration and recorded. Although most of these values were virtually unchanged during ultrafiltration, the temperature did rise and the flow-rate did fall during the final concentration from 36 to about 12 liters. The temperature was never allowed to reach 50° C., and the concentration was discontinued when the flow-rate had dropped to roughly half the nominal value (~250 mls/min).

Once the ultrafiltration of the LMW-heparin intermediate was complete, the 12 liter sample was placed into disposable polypropylene freeze-dryer trays (4 liters/tray). These were loaded into the freeze-dryer (Virtis) and temperature probes inserted. All trays were frozen overnight until all temperature probes had reached <–40° C. Vacuum was then applied to the freeze-dryer and the shelf temperature set at 40° C. Vacuum was continued until all temperature probes had reached at least 35° C. for at least four (4) hours (total drying time=48 hours). At this time, filtered air (0.2μ) was then bled into the chamber and the vacuum released. The dried LMW-heparin intermediate was then removed from the trays into a tared polyethylene polyliner bag and the weight of the LMW-heparin intermediate determined. A one (1) gram sample of this material was removed for retrospective molecular weight analysis and the remaining sample carried to Step 2A.

c. Step 2A. Oxidation of LMW-Heparin

All of the following steps were carried out in a cold-room (2°–10° C.). The dried LMW-heparin (550–600 grams) was dissolved in WFI-grade water (2°–10° C.) to give a 10% w/v solution. A 10 gallon polypropylene tank was used as the reaction vessel and dissolution was affected by means of Lightnin mixer set at medium speed. An equal volume (5.5–6.0 liters) of 100 mM sodium acetate buffer, pH 5.0 was prepared in a separate polypropylene tank with WFI-grade water (2°–10° C.), using ACS-grade reagents (sodium acetate and glacial acetic acid). Once prepared, the resultant buffer was admixed with the dissolved LMW-heparin intermediate. The room was then darkened and the polypropylene tank covered with a black polyethylene bag to exclude stray light. In a separate 10 gallon polypropylene tank, a volume of 200 mM sodium periodate (ACS-grade) was prepared by mixing solid $NaIO_4$ with an appropriate volume of WFI-grade water (2°–10° C.). The volume of sodium periodate solution prepared was equal to the combined volume of the LMW-heparin/acetate buffer admixture. Once the sodium periodate was dissolved (10–15 minutes, Lightnin mixer at medium speed), this solution was added with continued mixing to the LMW-heparin/acetate buffer solution. If necessary, a few mls of 50% NaOH were then added to this final mixture to adjust the pH of the entire reaction to 5.0 (±0.1). Final reaction concentrations were 2.5% LMW-heparin, 50 mM sodium acetate (pH=5), and 100 mM sodium periodate. The reaction vessel was continuously stirred and kept dark and cold for 72 hours. During this 72 hour period of oxidation, the pH and temperature of the reaction solution were monitored twice each 24 hours.

At the end of 72 hours, excess glycerol was added (400–450 mls) and mixed into the solution. Mixing was continued for 30–60 minutes to allow conversion of the majority of $NaIO_4$ to $NaIO_3$. The pH of the reaction was then raised to 6.75 (±0.25) with 50% NAOH (50–60 mls). The resultant solution was then stored covered in the dark and cold until ultrafiltration (Step 2B) could be carried out.

d. Step 2B. Purification of the Oxy-LMW-Heparin Intermediate

Step 2B was performed in the cold room with most light excluded until the concentration step (below). The crude oxy-LMW-heparin solution from Step 1a (~24 liters) was diluted to 36 liter with cold (2°–10° C.) WFI-grade water and ultrafiltered using the Millipore Pellicon II system with 3,000 Dalton cellulose membranes installed. The 36 liter sample was ultrafiltered against 7–8 volumes of WFI-grade water maintained at 2°–10° C. Once ultrafiltration was completed, the purified oxy-LMW-heparin solution was concentrated to a volume of about 12–14 liters and then stored overnight at 2°–10° C. in a polyethylene drum until the reduction (Step 3A) could be performed. All ultrafiltration conditions (membranes, pressures, flow rates, etc.) were exactly as described for the earlier procedure (Step 1B), except that WFI-grade water was utilized as the wash solution (diluent), rather than purified water.

e. Step 3A. Reduction of the Oxy-LMW-Heparin Intermediate

Steps 3A and 3B were performed in the cold room (2°–10° C.). It was no longer necessary to keep the reaction dark however, since periodate and iodate ions were removed in Step 2B. The oxy-LMW-heparin solution (12–14 liters) from Step 2B was stirred at medium speed with a Lightnin mixer and maintained at 2°–10° C. during the following reduction by jacketing the polypropylene tank with an ice-water solution. Solid sodium bicarbonate (generally about 275 grams) was dissolved in the oxy-LMW-heparin solution using the Lightnin mixer to give a final bicarbonate concentration of 0.25 M, and a pH=8.25 (±0.25). In a separate polypropylene container, solid sodium borohydride (>98% by assay, generally about 100 grams) was dissolved in an appropriate volume of ice cold (2°–10° C.) 0.1N NaOH (generally about 5.3 liters) to give a 0.5M solution of NaBH$_4$. Over the course of about 1 hour, the 0.5M NaBH$_4$ solution was slowly pumped (peristaltic pump equipped with Tygon tubing) into the buffered oxy-LMW-heparin with continuous agitation of the latter solution. Once all of the NaBH$_4$ solution had been added to the oxy-LMW-heparin, reduction was allowed to proceed for 3–3.5 hours and maintained at a temperature between 2° and 10° C.

Once 3–3.5 hours had elapsed, the reduction reaction solution was covered with a hooded canopy and excess borohydride destroyed by slow addition of 6N HCl solution until a final reaction pH of 4.0 (±0.2) was reached (generally 950 to 1050 mls of 6N HCl was required). After stirring the resultant acidified solution for about 30 minutes, the pH of the entire reaction solution was then raised to 6.75 by addition of 50% NaOH (usually requiring 40 to 50 mls). The canopy was then removed from the solution and resultant crude V-18 stored at 2°–10° C. until ultrafiltration (Step 3b) was performed.

f. Step 3B. Purification of V-18

Ultrafiltration of the crude V-18 during Step 3B was performed in the cold room (2°–10° C.). Final sterile filtration and freeze-drying of the ultrafiltered V-18 was carried out in a controlled access pilot laboratory maintained at ambient temperature (19°–26° C.). The crude V-18 heparinoid from Step 3A (~20 liters) was diluted to 36 liters with cold (2°–10° C.) WFI-grade water and ultrafiltered using the Millipore Pellicon II system equipped with 3,000 Dalton cellulose membranes. The 36 liter sample was ultrafiltered against 10–12 volumes of WFI-grade water maintained at 2°–10° C. All ultrafiltration conditions (membranes, pressures, flow rates, etc.) were as described earlier (Step 1B). Once ultrafiltration was completed, the purified V-18 heparinoid was concentrated to a volume of about 12 liters and placed in 5-gallon polyethylene drum. The pH of the resultant material was then adjusted to a pH of 7.75 (±0.25) with 50% NaOH (0.25 to 0.5 ml required).

The ultrafiltered V-18 was then sterile filtered and depyrogenated by passage of the ~12 liter solution through a series of two cartridge-type membranes. The first membrane was a 0.45µ Gelman nylon-66 capsule filter and the second was a Pall Posidyne 0.2µ nylon capsule filter. A peristaltic pump operated at ~1 liter/minute and fitted with Tygon tubing and the two sequential filters were used to pass the V-18 from the first polypropylene drum to another clean, depyrogenated drum of the same size.

Once the material was filtered, it was loaded (4 liters/tray) into disposable polypropylene freeze-dryer trays and loaded into a Virtis freeze-dryer. Calibrated temperature probes were inserted into one tray per shelf and the trays frozen overnight until all probes registered <−40° C. Vacuum was then applied to the freeze-dryer and the shelf temperature set at 40° C. Vacuum was continued until all temperature probes had reached at least 35° C. for at least four (4) hours (total drying time ≧48 hours). At this time, filtered air (0.2µ was then bled into the chamber and the vacuum released. The dried V-18 heparinoid bulk drug substance was then removed from the trays into a tared polyethylene polyliner bag and the weight of the final product determined. A second polyliner bag was then placed around the product and the double-bagged material placed in a 5-gallon fiber drum for storage. Two (2) bags of Desi-pac desiccant were then placed between the outer of the two polyliner bags and the inner wall of the fiber drum to absorb moisture. Storage of the resultant containers and V-18 product was in a locked cabinet maintained at 65°–75° F. Final yield of dry V-18 product was between 400 and 460 grams for each of the four lots prepared as described.

Tables 2 contains most of the salient details regarding all four (4) lots of V-18 manufactured under GMP conditions. Lot #1618-0002 was manufactured with a slightly different amount of sodium nitrite than was used in the other lots.

TABLE 2

| HPSEC-MALLS Results from Four Lots of V18 Product | | | | |
|---|---|---|---|---|
| Lot Number | 1618-0001 | 1618-0002 | 1618-0003 | 1618-0004 |
| >3,000 | 100[i] | 100 | 100 | 100 |
| >4,000 | 65.0 | 74.3 | 76.8 | 79.2 |
| >5,000 | 39.9 | 47.1 | 47.4 | 49.3 |
| >6,000 | 25.4 | 30.2 | 28.9 | 30.1 |
| >7,000 | 15.5 | 19.2 | 17.7 | 18.3 |
| >8,000 | 9.4 | 12.5 | 11.3 | 11.5 |
| >9,000 | 5.7 | 7.8 | 6.8 | 6.9 |
| Mw[ii] | 5,201 | 5,565 | 5,523 | 5,599 |
| Mn[iii] | 4,683 | 5,008 | 5,035 | 5,111 |
| Mw/Mn[iv] | 1.111 | 1.111 | 1.097 | 1.095 |

[i]Weight fraction above a given molecular weight, expressed in percent.
[ii]Weight-average molecular weight.
[iii]Number-average molecular weight.
[iv]Polydispersity.

B. Filtration-Based Assay

In addition to examining the ability of various heparin derivatives to catalyze HCII-mediated inactivation of fluid-phase thrombin, their ability to displace and inactivate fibrin-bound to thrombin was also studied. In this system, a fibrin clot was formed on a filter-covered well of a 96-well plate by adding 25 µl of buffer containing 8 µM fibrinogen, 8 mM CaCl$_2$ and 8 nM $^{125}$I-labeled thrombin to each well. After incubation for 30 minutes at room temperature, the resultant clot was washed twice with 150 µl of buffer and the bound thrombin was quantified by counting the radioactivity. Varying concentrations of the different materials derived from heparin were added with and without HCII. In each case, these components were added in a 20 µl volume, incubated for 20 min and then aspirated through the filter plate. This step was repeated and the clot was then washed twice with 50 µl of buffer. The amount of thrombin displaced from the clot was determined by counting the wash buffer, whereas the amount of thrombin that remained bound to the fibrin was quantified by counting the filter. The enzymatic activity of the residual bound thrombin was determined by adding a synthetic thrombin substrate and monitoring changes in the fluorescent signal due to the reaction over a 3 minute interval. Finally, the wash buffers were collected and the filters were punched out and after boiling in SDS-containing buffer, were subjected to SDS-PAGE followed by autoradiography to determine the extent to which thrombin was complexed to HCII.

As illustrated in FIG. 1, 1 µM HCII (which is the physiologic HCII concentration) displaces only small amounts of thrombin. SH, LASH, LMWH and a heparin fraction with a molecular weight of 3,000 Daltons do not displace thrombin without HCII. However, when used in conjunction with 1 µM HCII, these substances all displace thrombin (FIG. 1), with SH and LASH producing more displacement than LMWH (which has an average molecular weight of about 5,500 Daltons). However, all of the agents inhibit the thrombin that remains bound to the fibrin (FIG.

2), with the SH and LASH producing almost complete inhibition at high concentrations and the LA-LMWH producing somewhat less inhibition. Gel analysis of the material that remains bound to the filter indicates that most of the thrombin is complexed to HCII, thereby explaining its lack of chromogenic activity. These findings suggest that the thrombin that remains bound to the fibrin is bound via exosite 2, thereby leaving exosite 1 and the active site available to interact with HCII.

C. Hanging Clot Assay

The Hanging Clot Assay is used to examine the inhibitory effect of agents against fluid-phase and clot-bound thrombin activity. To determine the inhibitory effect against fluid-phase thrombin activity, α-thrombin (0.2–4.0 nM) was incubated with citrated plasma for 60 min at 37° C. in the absence or presence of heparin at the concentrations indicated. At the end of the incubation period, the plasma levels of Fibrinopeptide A (FPA) were determined, and the percent inhibition of FPA generation was then calculated for each inhibitor concentration. To determine the inhibitory effect against clot-bound thrombin activity, washed fibrin clots were incubated in citrated plasma for 60 min at 37° C. in the absence or presence of varying concentrations of heparin. At the end of the incubation period, the plasma levels of FPA were determined, and the percent inhibition of clot-induced FPA generation was then calculated for each inhibitor concentration. Each bar represents the mean of three separate experiments (each done in duplicate), while the lines above the bars represent the SD.

Figure 3A:
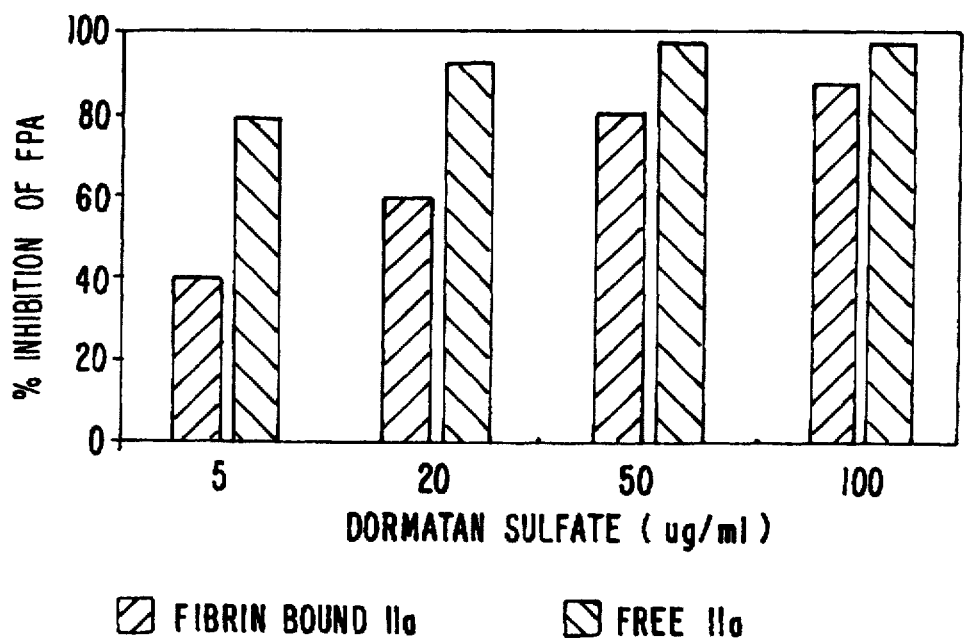
FIGS. 3A and 3B illustrate the ability of dermatan sulfate and a HCII-specific catalyst of the present invention, i.e., LA-LMWH, respectively, to inactivate free and fibrin-bound thrombin using the "hanging clot" assay.
Figure 3B:
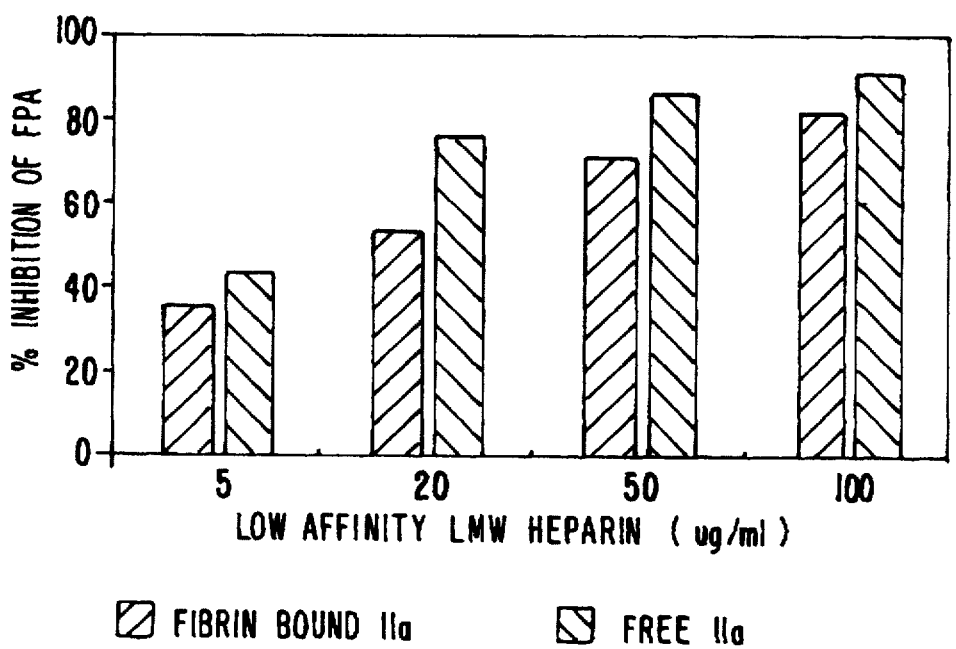

FIGS. 3A and 3B illustrate studies comparing the relative ability of dermatan sulfate (the prototype HCII catalyst) and one of the HCII-specific catalysts of the present invention, i.e., LA-LMWH, to inactivate free and fibrin-bound thrombin using the hanging clot assay. At 5 µg/ml, LA-LMWH was much more selective than dermatan sulfate (dermatan sulfate was only half as effective at inactivating fibrin-bound thrombin, while LMWH was almost as effective at inactivating fibrin bound and free thrombin). At 20 µg/ml the advantage of LA-LMWH is still apparent, although less obvious, and then at higher concentration both are almost 90% as effective at inactivating fibrin-bound and free thrombin.

Other results from the Hanging Clot Assay also indicate that the LA-LMWH HCII catalyst of the present invention binds to and inactivates clot-bound or thrombus-bound thrombin. In these experiments, a 250 µl clot containing labelled thrombin was suspended in 10 ml of solution containing either 150 mM NaCl or 2 M NaCl. One of the following was added to the isotonic buffer: HCII 0.25 or 0.5 µM, 100 µg of the LA-LMWH HCII-specific catalytic agent, or the combination of HCII and the LA-LMWH HCII-specific catalytic agent. The following measurements were made: (1) diffusion of thrombin out of the clot; (2) the catalytic activity of thrombin on the clot, which was assessed by measuring fibrinopeptide A production after removing the clot and adding it to a fibrinogen solution; and (3) the extent of thrombin/HCII complex formation, which was assessed by solubilizing the clot and performing SDS-PAGE and autoradiography.

Figure 4:
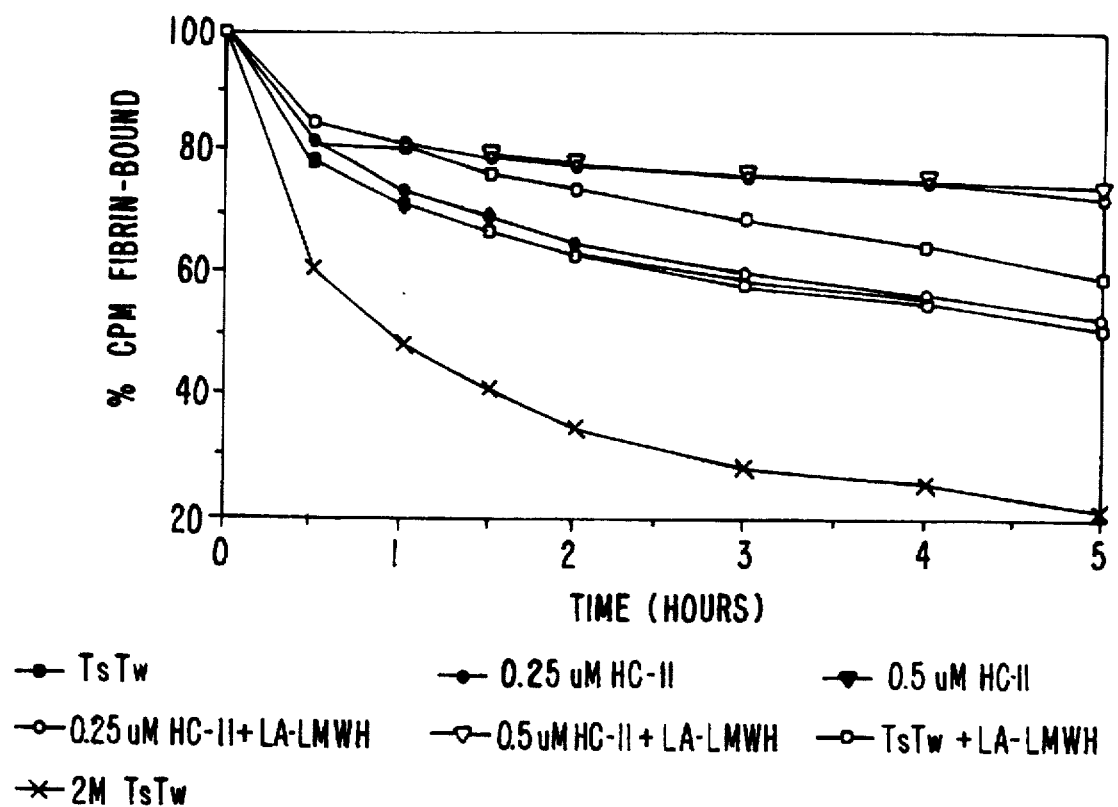
FIG. 4 illustrates the rate of diffusion of labelled thrombin from the fibrin clot.

FIG. 4 illustrates the rate of diffusion of labelled thrombin from the fibrin clot. After 5 hours, about 40% of the thrombin remained in the clot suspended in 150 mM NaCl. Neither the addition of HCII alone or in combination with the LA-LMWH HCII-specific catalytic agent influenced the rate of diffusion. In fact, the combination of HCII and the LA-LMWH HCII-specific catalytic agent actually reduced the diffusion rate to a small extend. In contrast, the diffusion rate of thrombin was markedly increased when the clot was suspended in 2M NaCl.

Figure 5:
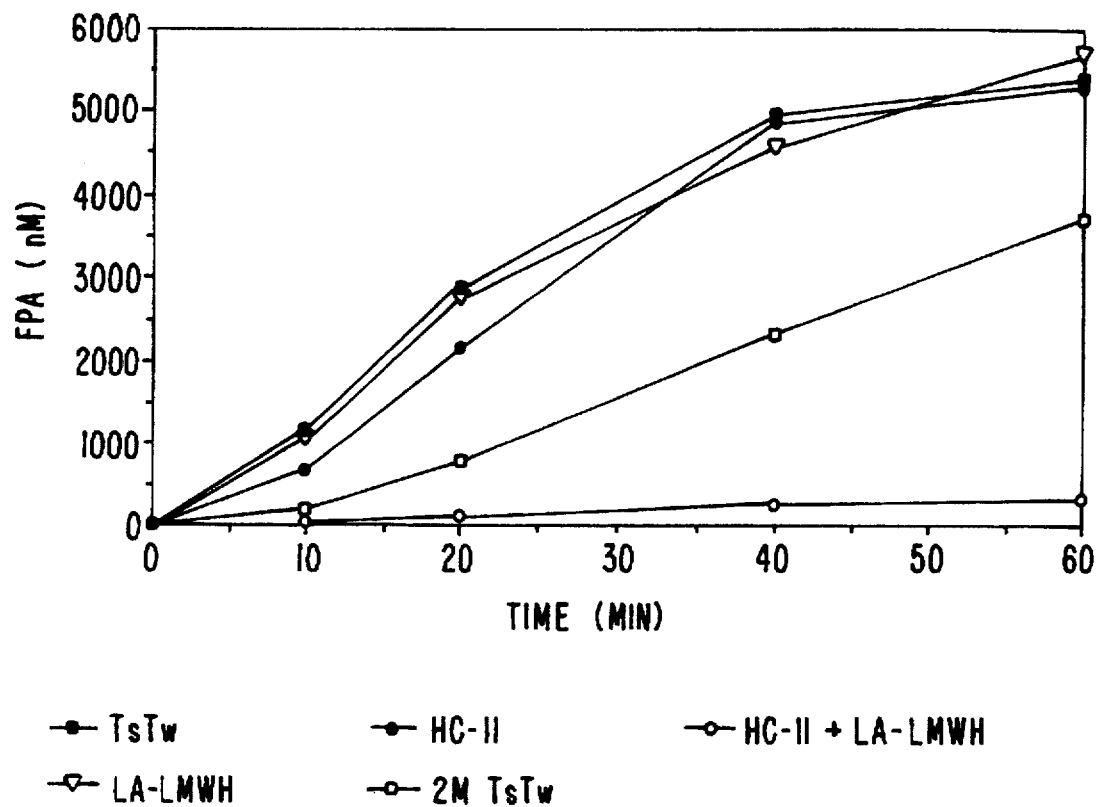
FIG. 5 illustrates the effect of 0.25 µM HCII, with and without 60 µg/ml of one of the HCII-specific catalytic agents of the present invention (i.e., LA-LMWH), on the activity of fibrin-bound thrombin in purified fibrinogen.

FIG. 5 compares the catalytic activity of clot-bound thrombin measured by removing the clot after five hours of incubation with the initial solutions and suspending it in a fibrinogen solution. Clots that have been suspended in 150 nM NaCl in the presence or absence of HCII or the LA-LMWH HCII-specific catalytic agent alone generated about 6000 nM FPA. In contrast, FPA production by clots that had been suspended in 150 mM containing the combination of HCII and the LA-LMWH HCII-specific catalytic agent was suppressed by approximately 95%. The clots that had been suspended in 2M NaCl generated about 4000 nM FPA, consistent with the fact that these contain about half the thrombin found in clots incubated in low salt buffer with or without HCII. These findings indicate that the LA-LMWH HCII-specific catalytic agent of the present invention inactivates clot-bound thrombin in the presence of HCII, but as illustrated in FIG. 4, it does this without displacing thrombin from the clot. This supports the concept that thrombin binds to fibrin via exosite 2, leaving exosite 1 available to interact with HCII (see, U.S. patent application Ser. No. 08/175,211 (filed Dec. 27, 1993 now abandoned), the teachings of which are hereby incorporated by reference).

Analysis of the gels indicates that a large percentage of the thrombin recovered from the clots that had been suspended in buffer containing the combination of HCII and the LA-LMWH HCII-specific catalytic agent was complexed to HCII. In contrast, predominately uncomplexed thrombin was recovered in clots suspended in buffer containing HCII alone or the LA-LMWH HCII-specific catalytic agent alone. These findings indicate that the LA-LMWH HCII-specific catalytic agent of the present invention produces permanent inactivation of clot-bound thrombin by catalyzing covalent complex formation between thrombin and HCII.

D. Extracorporeal Recirculation Circuit

The selective ability to inactivate fibrin-bound thrombin was demonstrated by using an extracorporeal closed circuit containing human blood to measure the ability of various anticoagulants to inactivate surface-bound thrombin, and the thrombin clotting time was used to measure the ability of the various anticoagulants to inactivate fluid-phase thrombin. A HCII-specific catalytic agent of the present invention, i.e., LA-LMWH, was compared to the following anticoagulants: dermatan sulfate, low molecular weight heparin, unfractionated heparin and hirudin.

1. The Extracorporeal Closed Circuit

Figure 6:
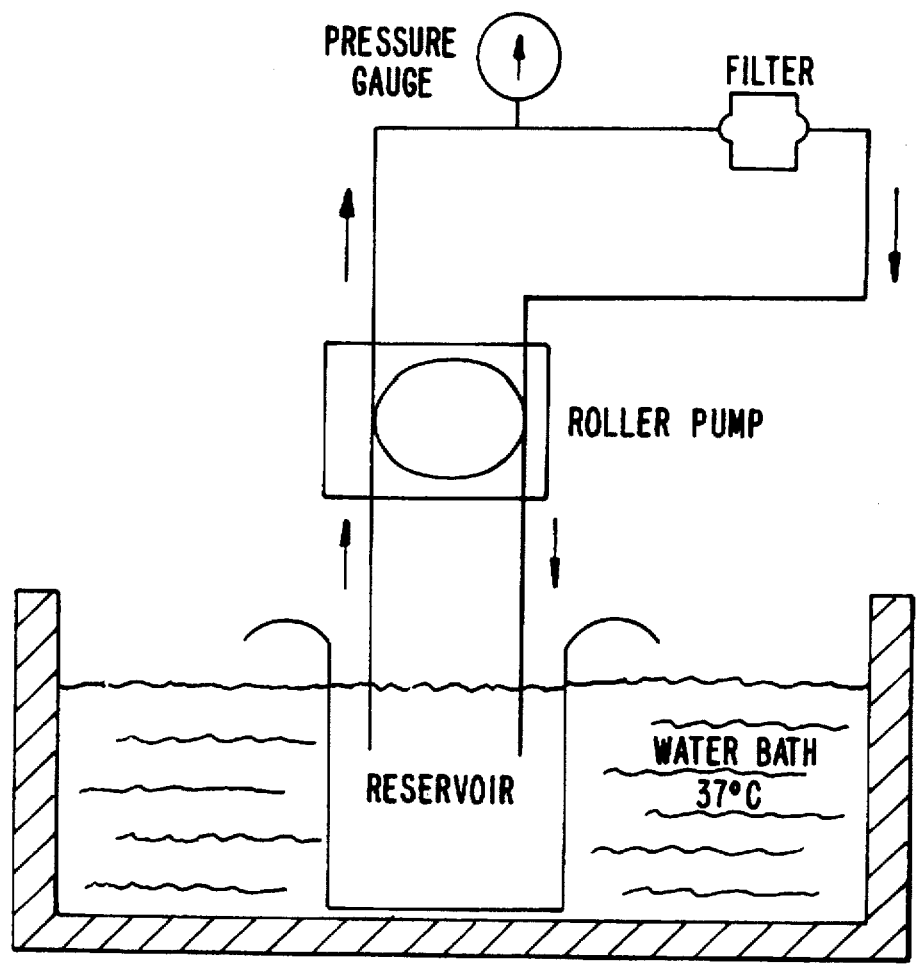
FIG. 6 illustrates the extracorporeal recirculation circuit used to examine the ability of an agent to inhibit clotting in a human whole blood system.

A diagram of the extracorporeal closed circuit is shown in FIG. 6. The circuit consists of Tygon tubing ($\frac{3}{16}$"×$\frac{1}{16}$") connected to a 40 micron transfusion filter (Pall SQ40S). The system includes 3-way stopcocks for blood sampling. A surgical pressure transducer connected to a pressure recorder (Hewlett-Packard) is connected in line with the filter so that clotting of the filter causes a steady increase in pressure. Citrated whole blood taken from normal, healthy volunteers is used. The circuit is filled with 50 ml of whole blood placed in a reservoir and kept in a waterbath maintained at 37° C. The anticoagulant to be tested is added to the circuit, clotting is initiated by recalcification (0.8 ml of 1.0M CaCl$_2$), and the blood is recirculated at a constant flow rate through the thrombogenic surface using a roller head pump (Cole-Parmer MFLX modular drive with a large F/6 roll head cartridge). Thrombosis of the filter is monitored by a change in pressure in a gauge inserted into the circuit, proximal to the filter. Progressive obstruction to flow occurs as fibrin forms on the surface of the filter and, in addition, as thrombin bound to the clot or thrombus promotes further clotting.

The inactivation of surface-bound thrombin and fluid-phase thrombin can be measured simultaneously using this system. More particularly, inactivation of surface-bound thrombin is quantified by recording the delay in clotting of the circuit. This delay is contributed to, albeit to a lesser extent, by the inactivating effect of the anticoagulant on fluid phase thrombin, whose generation is potentiated by the clot-bound thrombin. Inactivation of fluid phase thrombin is quantified by recording the thrombin clotting time of plasma prepared from blood removed from the circuit just before recalcification.

2. Results

Figure 10:
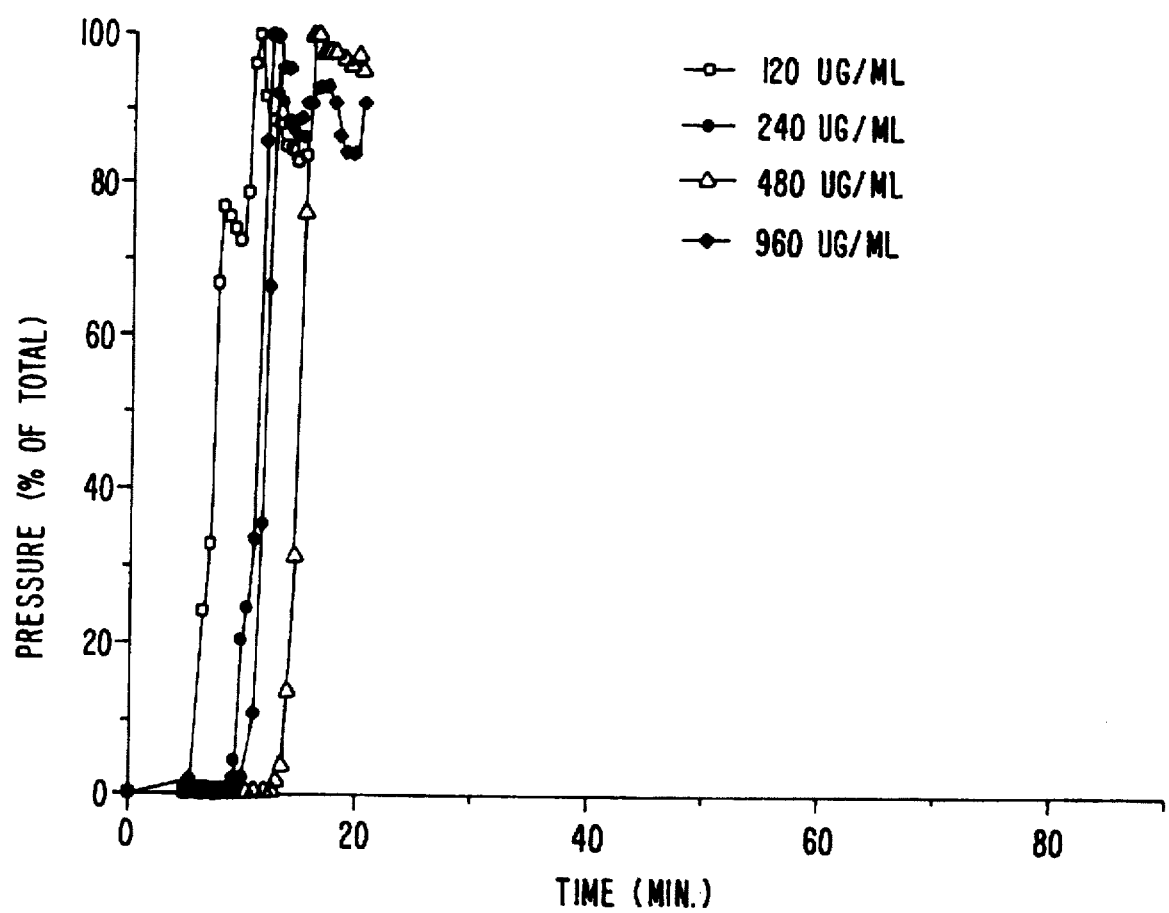
FIGS. 10 and 11 illustrate the comparative effects dermatan sulfate and one of the HCII-specific catalytic agent of the present invention. i.e., LA-LMWH, have on clotting in the extracorporeal recirculation circuit over a concentration range of 120 µg/ml to 960 µg/ml.
Figure 11:
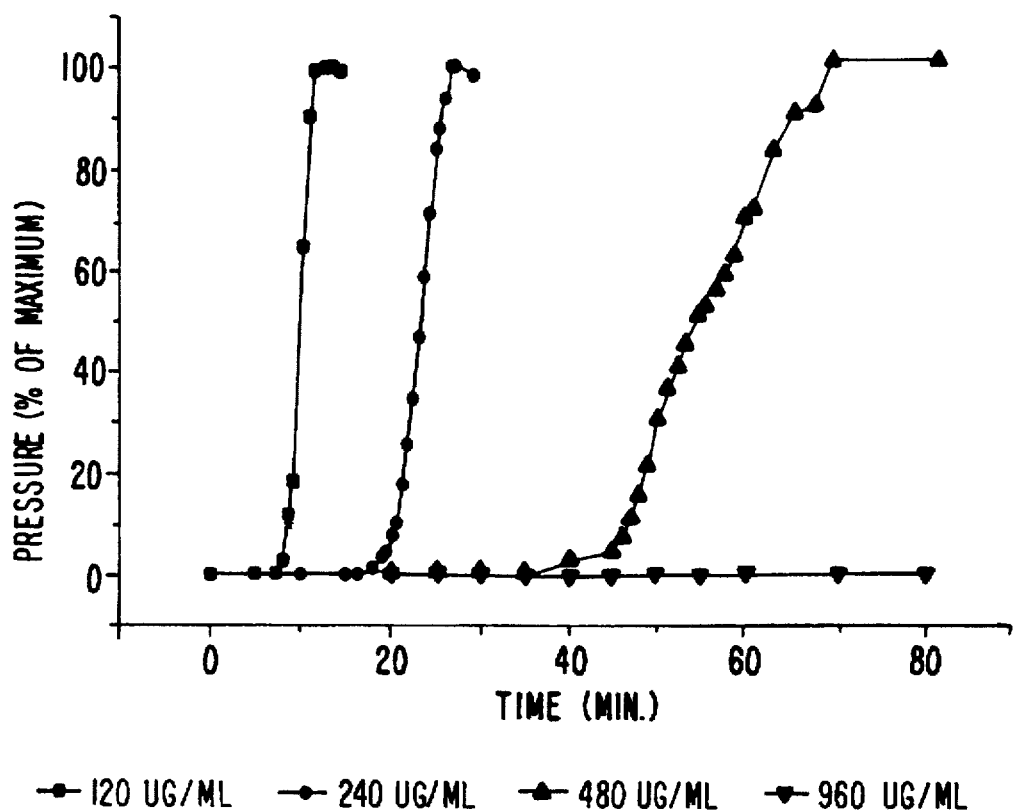
Figure 12:
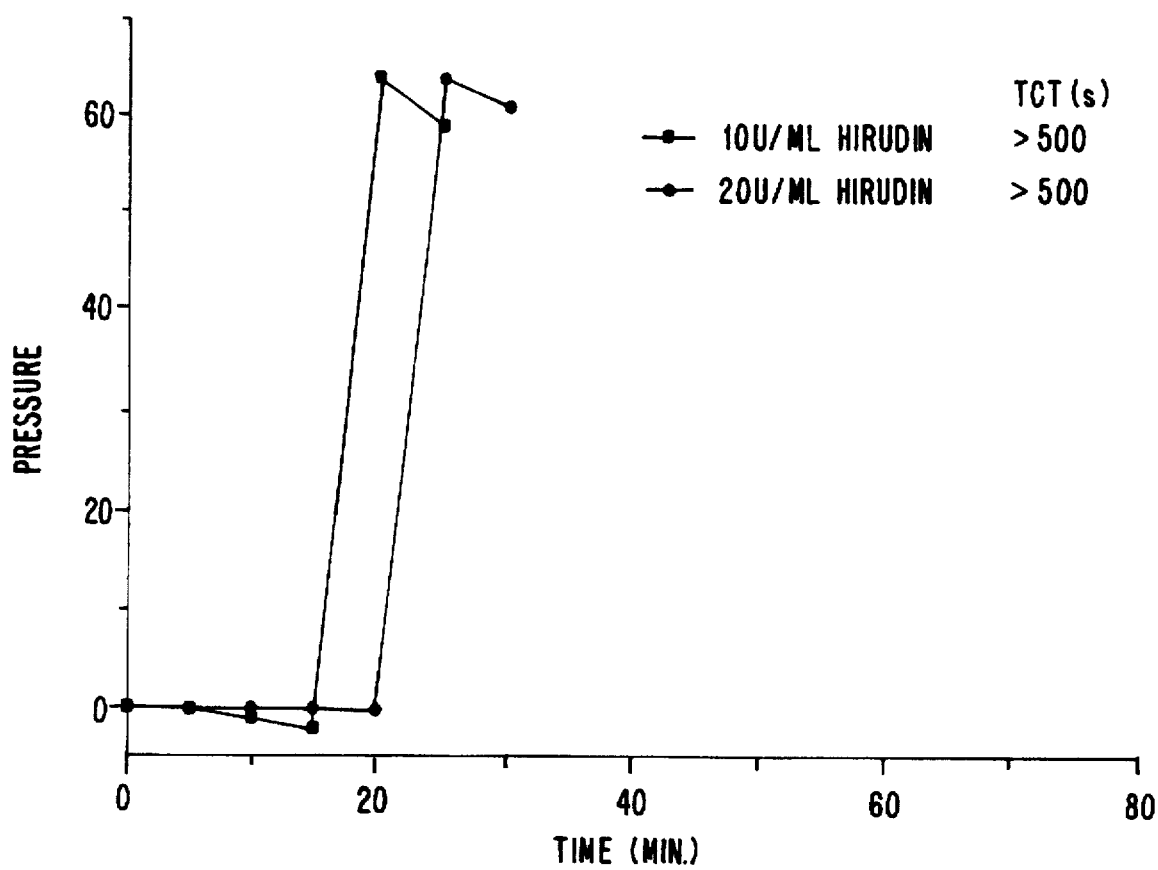
FIG. 12 illustrates the effects hirudin has on clotting in the extracorporeal recirculation circuit over a concentration range of 10 U/ml to 20 U/ml.

The following points summarize the results of experiments in which: a) one of the two HCII catalysts, i.e., the LA-LMWH HCII-specific catalytic agent or dermatan sulfate, was added to the blood alone (FIG. 7); b) the HCII catalysts were added in combination with a low concentration (less than 2% by weight) of an unmodified low molecular weight heparin (LMWH) (FIG. 8); c) the unmodified LMWH was added alone (FIG. 9); d) dermatan sulfate was added alone (FIG. 10); e) hirudin was added alone (FIG. 12); and f) the LA-LMWH was added alone (FIG. 11).

FIGS. 10 and 11 illustrate the comparative effects dermatan sulfate and the LA-LMWH HCII-specific catalytic agent of the present invention have on clotting in the circuit over a concentration range of 120 µg/ml to 960 µg/ml. As seen in FIG. 4, the LA-LMWH HCII-specific catalytic agent produces a dose-dependent inhibition of clotting in the circuit. More particularly, clotting occurs in the circuit in about 20 minutes with a LA-LMWH dose of 240 µg/ml, and is abolished with a LA-LMWH dose of 960 µg/ml. The corresponding thrombin clotting times are shown in Table 3. Table 4 shows the comparative effects of various concentrations of LMWH or blends of LA-LMWH with LMWH or dermatan sulfate. The thrombin clotting time was 26 seconds at a LA-LMWH concentration of 240 µg/ml, and 43.6 seconds for a LA-LMWH concentration of 960 µg/ml. In contrast, as shown in FIG. 11, clotting in the circuit occurred in less than 10 minutes with a dermatan sulfate dose of 240 µg/ml, even though the corresponding thrombin clotting time was over 500 seconds (see, Table 3). Moreover, clotting in the circuit occurred in less than 20 minutes with a dermatan sulfate dose of 960 µg/ml, even though the corresponding thrombin clotting time was 841 seconds (see, Table 3).

TABLE 3

|  | TCT (seconds) |
|---|---|
| Baseline | 19.2 |
| LA LMWH 120 µg/mL | 26.5 |
| LA LMWH 240 µg/mL | 31.5 |
| LA LMWH 480 µg/mL | 37.2 |
| LA LMWH 960 µg/mL | 43.6 |
| DS 120 µg/mL | 75.9 |
| DS 240 µg/mL | 445 |
| DS 480 µg/mL | 577 |
| DS 960 µg/mL | 841 |

TABLE 3-continued

|  | TCT (seconds) |
|---|---|
| LAH 120 µg/mL | 556 |
| LAH 240 0µg/mL | 717 |
| LAH 480 µg/mL | 1065 |
| LAH 960 µg/mL | 3403 |
| Hirudin 10 U/mL | >500 |
| Hirudin 20 U/ml | >500 |

TABLE 4

THROMBIN CLOTTING TIME (2 unit)

| ADDITION | TCT (seconds) |
|---|---|
| Control | 21 |
| 0.5 unit/mL LMWH | 20 |
| 1.0 unit/mL LMWH | 37 |
| 2.0 unit/mL LMWH | 64 |
| 240 µg/mL LA-LMWH | 26 |
| 240 µg/mL DS | >500 |
| 0.5 unit/mL LMWH + 240 µg/mL LA-LMWH | 20 |
| 0.5 unit/mL LMWH + 240 µg/mL DS | >500 |
| 1 unit/mL LMWH + 240 µg/mL LA-LMWH | 38 |
| 1 unit/mL LMWH + 240 µg/mL DS | >500 |

Figure 7:
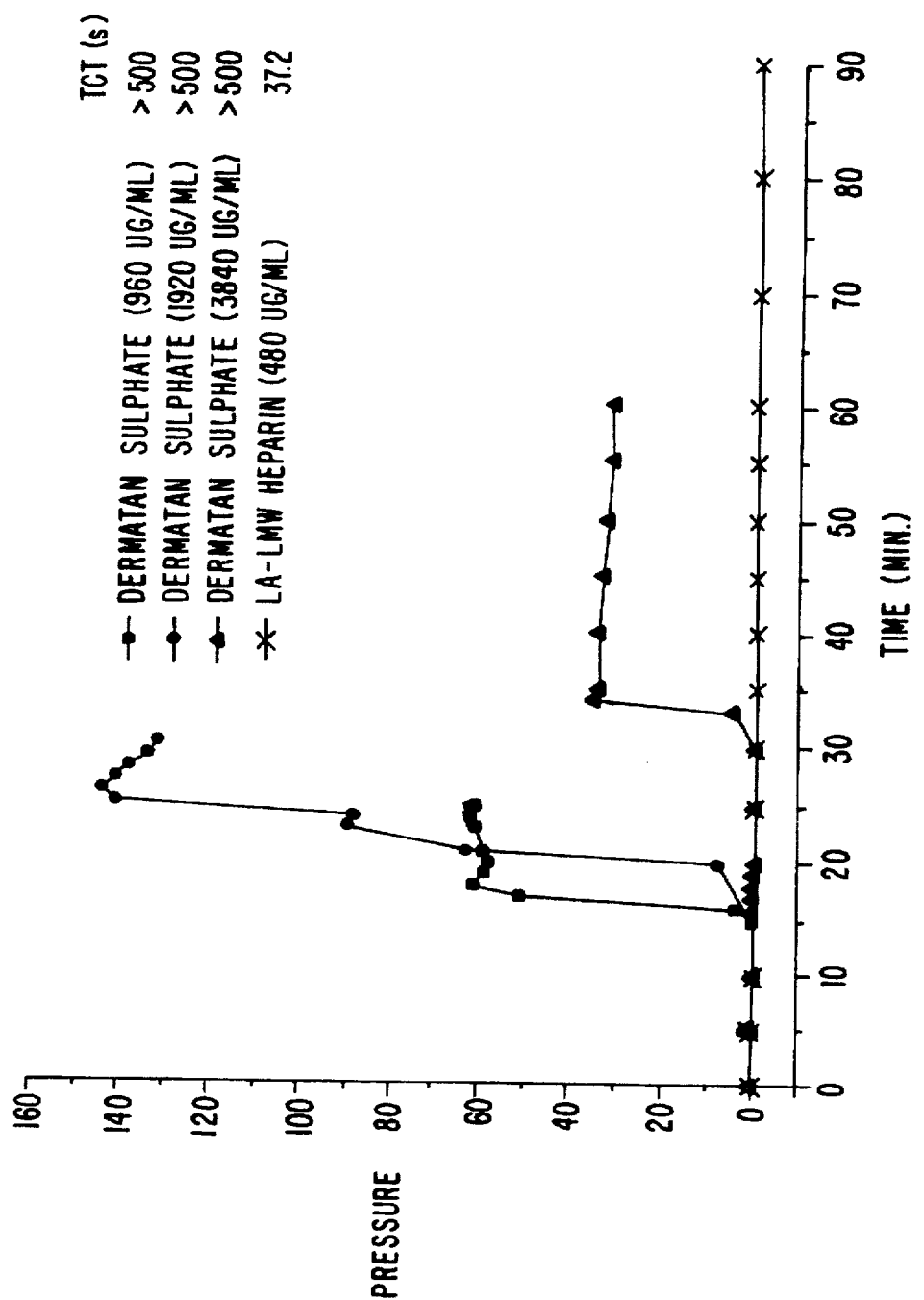
FIG. 7 illustrates the comparative effects dermatan sulfate and one of the HCII-specific catalytic agents of the present invention (i.e., LA-LMWH) have when aliquots of the same human blood sample were tested in the extracorporeal recirculation circuit.

LMWH Low molecular weight heparin
LA-LMWH Low affinity, low molecular weight heparin
DS - Dermatan sulfate In addition, the relative effects of the LA-LMWH HCII-specific catalytic agent and dermatan sulfate were compared when aliquots of the same human blood sample were tested in the model (FIG. 7). On a weight basis, the LA-LMWH HCII-specific catalytic agent is more effective than dermatan sulfate at preventing thrombosis of the circuit. Thus, 480 µg/ml of the LA-LMWH HCII-specific catalytic agent was able to completely prevent clotting for 90 minutes, whereas an 8-fold increase in the amount of dermatan sulfate could not totally prevent clotting in the circuit. In contrast, dermatan sulfate is a much more effective inhibitor of fluid phase thrombin (see, Table 3). For example, in this experiment at 240 µg/ml, the thrombin clotting time for the LA-LMWH HCII-specific catalytic agent is about 26 seconds (control 21 seconds) compared to greater than 500 seconds for dermatan sulfate.

Figure 9:
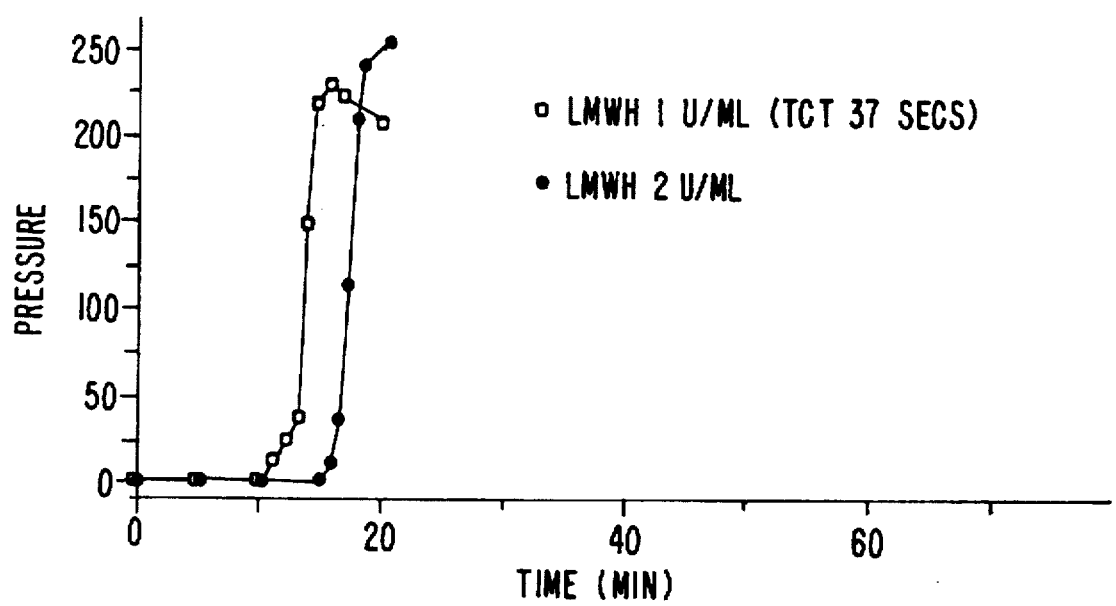
FIG. 9 illustrates the effects of 1 anti-Xa unit/ml and 2 anti-Xa units/ml of unmodified LMWH on clotting of the filter and on the thrombin clotting time (TCT).

FIG. 9 illustrates the effects of 1 anti-Xa unit/ml and 2 anti-Xa units/ml of unmodified LMWH on clotting of the filter and on the thrombin clotting time. At these concentrations, the LMWH has minimal effects on preventing shunt thrombosis even though the thrombin clotting time was prolonged to 37 and 64 seconds, respectively (see, Table 4).

Figure 8:
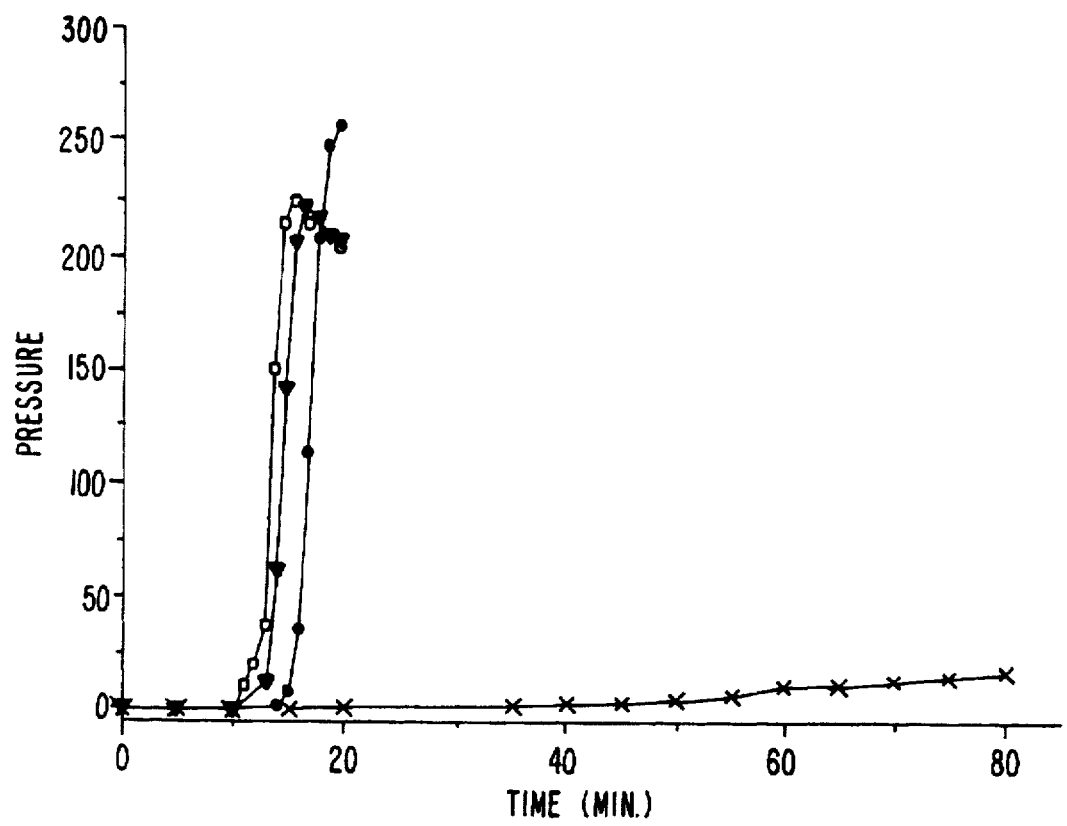
FIG. 8 illustrates the results of using a blend of an HCII-specific catalytic agent, i.e., LA-LMWH, and an ATIII catalytic agent (e.g., LMW-heparin).

FIG. 8 illustrates the results of using a blend of the HCII catalysts and an efficient ATIII catalyst (e.g., LMWH). At concentrations of 0.5 anti-factor Xa units/ml of LMWH (which produced a thrombin clotting time of 20 seconds), unmodified LMWH was ineffective at preventing clotting of the filter, but when the same amount of LMWH was used in conjunction with 240 µg/ml of the LA-LMWH HCII-specific catalytic agent, the blend was highly effective in inhibiting clotting of the filter. The blend of the LMWH and dermatan sulfate was also very effective. However, the corresponding thrombin clotting time for the LMWH/ dermatan sulfate combination was greater than 500 seconds, whereas the corresponding thrombin clotting time for the blend of the LMWH/LA-LMWH HCII-specific catalytic agent was only 20 seconds (see, Table 4).

These findings clearly indicate that compared to dermatan sulfate, the LA-LMWH HCII-specific catalytic agent of the present invention has selective activity against fibrin-bound thrombin. Thus, it is more effective than dermatan sulfate at preventing filter clotting, but it produces much less prolongation of the thrombin clotting time because it has less inhibitory activity against fluid phase thrombin.

In contrast to the LA-LMWH HCII-specific catalytic agent, hirudin is much less effective at preventing thrombosis in the circuit at concentrations which prolong the thrombin clotting time to over 500 seconds, at concentrations which prolong the thrombin clotting time to less than 500 seconds (see, FIG. 12 and Table 3), and when a combination of the LA-LMWH HCII-specific catalytic agent and LMWH are used to prolong the thrombin clotting time to less than 30 seconds (see, FIG. 9 and Table 3).

E. Animal Disease Models of Venous Thrombosis Prevention

1. Surgical Procedures

Studies were done in male New Zealand white rabbits weighing between three and four kilograms. The right and left jugular veins were exposed through a ventral incision in the neck. A 2 cm segment of each jugular vein was identified and side branches were ligated. After a venous blood sample was collected for coagulation studies, the animals were randomized to receive an intravenous bolus of either low affinity standard heparin, low affinity low molecular weight heparin, or saline. Four minutes after this treatment, a second blood sample was collected for coagulation studies. A 4 French balloon catheter was then introduced into the right jugular vein and the balloon was inflated and the endothelium within the 2 cm jugular vein segment was damaged by 15 passages of the inflated balloon. Stasis was then induced within the 2 cm segment by placing two tourniquets approximately 2 cm apart around the blood filled segment. As soon as this was done, an intravenous bolus of thromboplastin (7 mg/kg) was injected into the left jugular vein and stasis in this vein was induced by placing two tourniquets 2 cm apart around a blood filled segment. After 15 minutes of venous occlusion, a blood sample was taken for coagulation studies and the venous segments were then explanted and the clots contained therein were weighed.

2. Results

Figure 13:
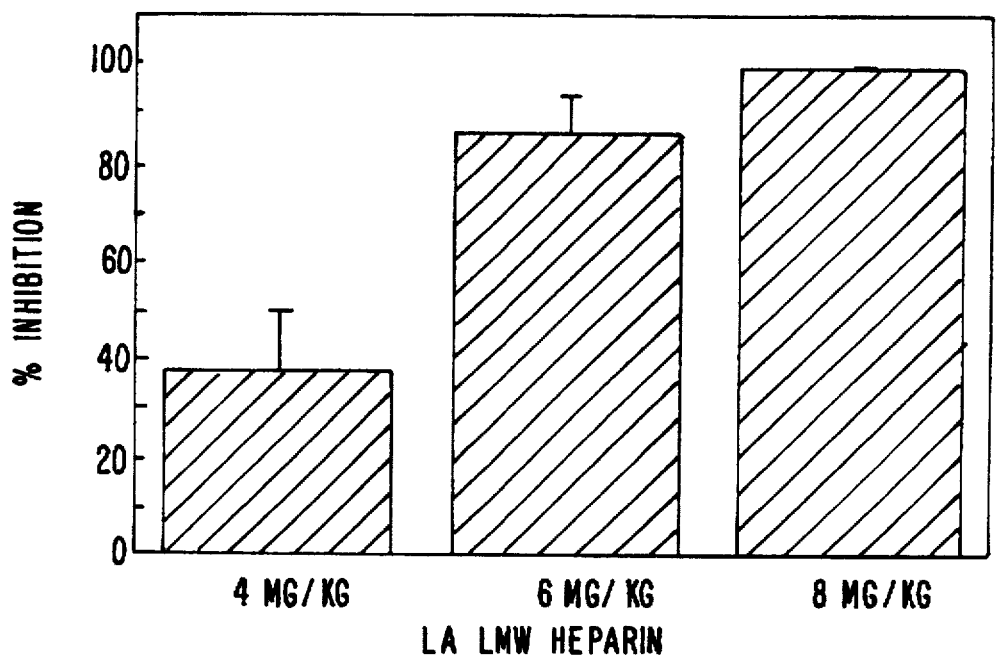
FIG. 13 illustrates the effect of one of the HCII-specific catalytic agents of the present invention. i.e., LA-LMWH, on clot weight after balloon injury.
Figure 14:
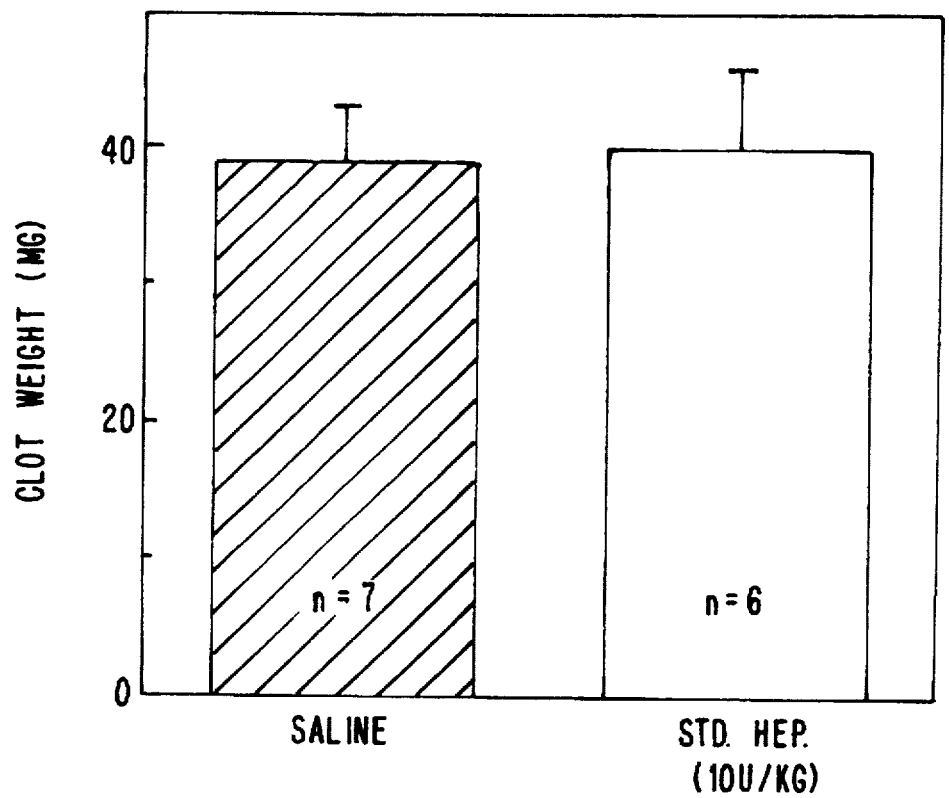
FIG. 14 illustrates the effect of standard heparin on clot weight after balloon injury.
Figure 15:
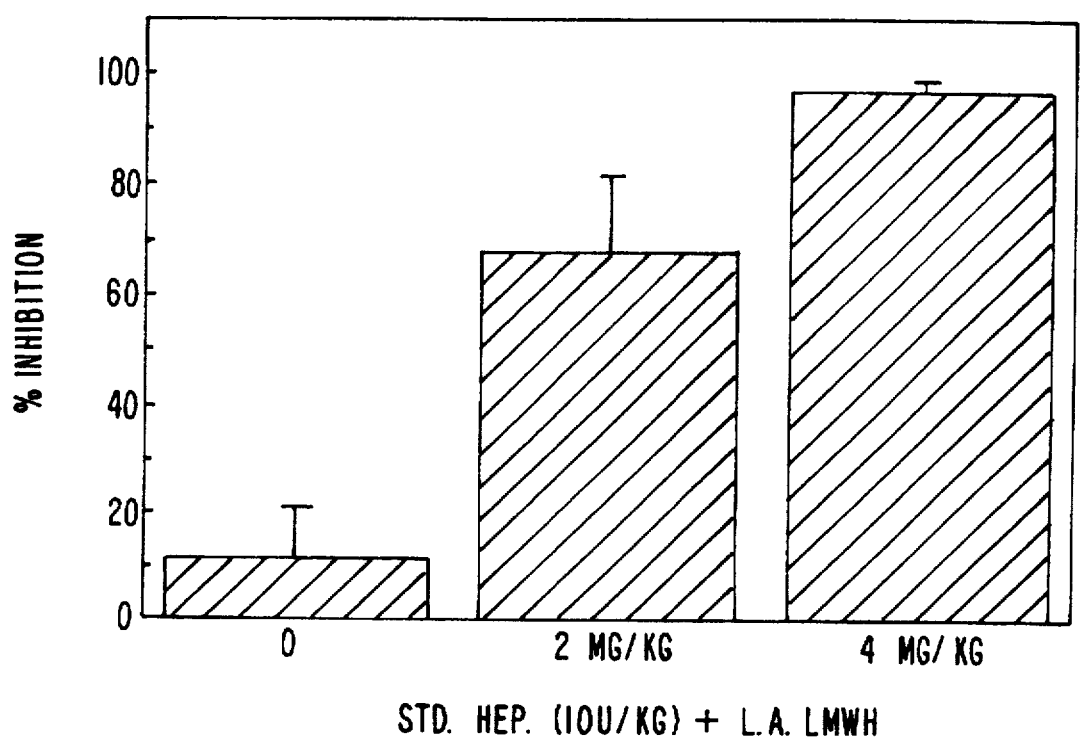
FIG. 15 illustrates the effect of standard heparin and one of the HCII-specific catalytic agents of the present invention. i.e., LA-LMWH, on clot weight after balloon injury.

The LA-LMWH HCII-specific catalytic agent of the present invention have been studied in a rabbit model simulating prophylaxis in high risk states. A dose response relationship was established. At 8 mg/kg (about 100 µg/ml which is about five times lower than that required to prevent thrombosis in the bypass circuit), there was complete inhibition of thrombosis (see, FIG. 13). To test the synergistic effect of combining the LA-LMWH HCII-specific catalytic agent of the present invention with an ATIII catalyst, the combination of heparin at a concentration of 10 U/kg (a concentration which has no effect on thrombus formation (see, FIG. 14)) and the LA-LMWH HCII-specific catalytic agent at a concentration of 2 mg/kg and 4 mg/kg was studied. Over 60% inhibition of thrombosis was seen when 2 mg/kg of the LA-LMWH HCII-specific catalytic agent was used (a dose which had virtually no effect when used alone), and 100% inhibition of thrombosis was seen when 4 mg/kg of the LA-LMWH HCII-specific catalytic agent was used (a dose which produced less than 40% inhibition when used alone) (see, FIG. 15). The thrombin clotting time was not increased when 8 mg/kg of the LA-LMWH was used alone, or when it was used in combination with 10 U/kg heparin, indicating that effectiveness is seen with minimal inhibitory effects on free thrombin.

SH and LMWH with low affinity for ATIII (LASH and LA-LMWH; respectively) were prepared from SH (specific activity, 160 anti-Xa and anti-IIa units/mg) and LMWH (specific activity, 100 anti-Xa U/mg), respectively, by periodate oxidation and subsequent reduction as described in Casu, B., et al., "Retention of antilipemic activity by periodate-oxidized nonanticoagulant heparins," *Arzneim-Forsch/Drug Res.* 36:637–42 (1986). The anticoagulant activities of the low affinity derivatives were then compared with those of the starting materials and dermatan sulfate (DS). As illustrated in Table 5, when compared in equivalent amounts by weight, LASH and LA-LMWH are essentially devoid of anti-Xa activity, indicating that they can no longer potentiate antithrombin III-mediated inactivation of factor Xa. In addition, these low affinity derivatives have less of an effect on the thrombin clotting times (TCT) than do the parent compounds. Thus, by abolishing their ability to catalyze ATIII, their anticoagulant activity has been reduced.

TABLE 5

| GAG (conc.) | Anti-Xa U/ml |
|---|---|
| SH (0.5 U/ml) | 0.3 |
| SH (2.0 U/ml) | 1.3 |
| SH (10.0 U/ml) | 6.0 |
| LASH (3 µg/ml) | 0.07 |
| LASH (11 µg/ml) | 0.06 |
| LASH (50 µg/ml) | 0.06 |
| LMWH (0.5 U/ml) | 0.6 |
| LMWH (2.0 U/ml) | 2.8 |
| LMWH (10.0 U/ml) | 11.0 |
| LA LMWH (5 µg/ml) | 0.04 |
| LA LMWH (20 µg/ml) | 0.05 |
| LA LMWH (100 µg/ml) | 0.06 |
| DS (1 µg/ml) | 0.05 |
| DS (10 µg/ml) | 0.06 |
| DS (100 µg/ml) | 0.05 |

Figure 2:
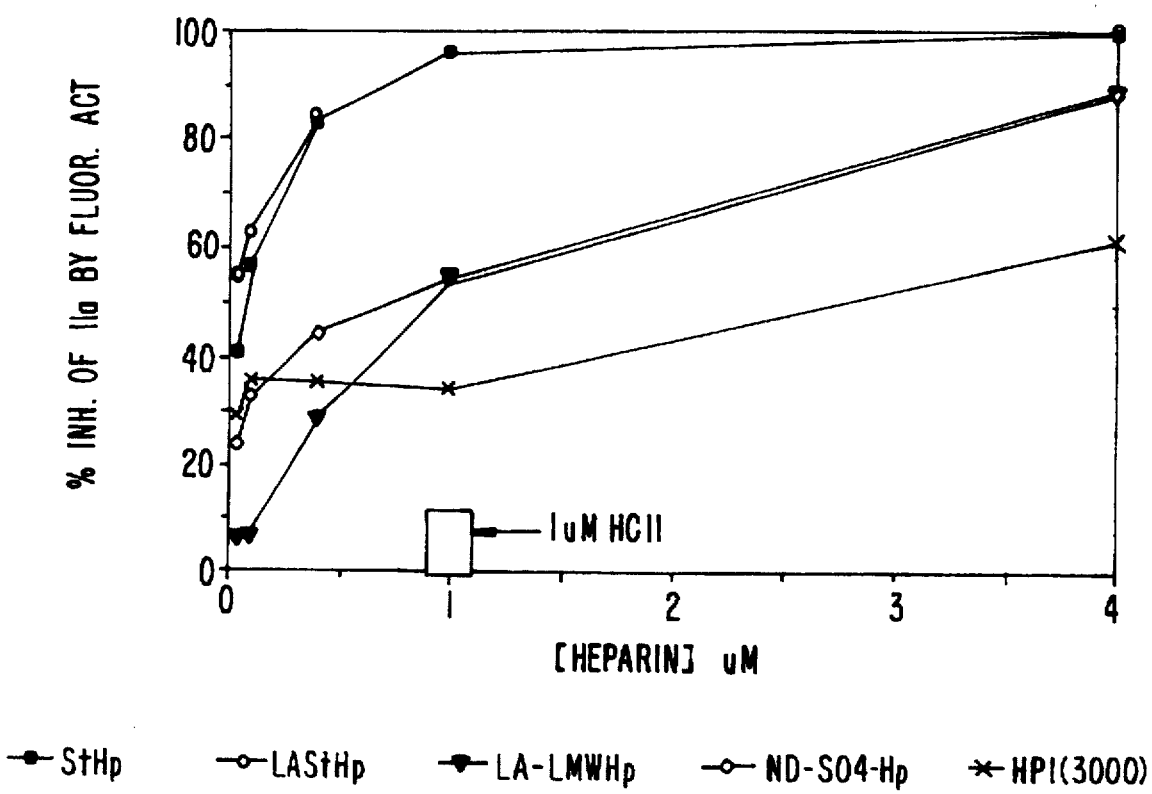

When the activity of heparin fractions of different molecular weights were compared, a 9,000 Daltons fraction had activity close to that of SH, whereas a 5,000 Daltons fraction had activity closer to that of LMWH. In contrast, a 3,000 Daltons fraction had much less activity (FIGS. 2 and 3). These findings again are consistent with the concept that maximal catalysis of HCII occurs with heparin chains containing 20 or more monosaccharide units, which corresponds to a molecular weight of 8,000 Daltons or higher.

It is to be understood that the above description is intended to be illustrative and not restrictive. Many embodiments will be apparent to those of skill in the art upon reading the above description. The scope of the invention should, therefore, be determined not with reference to the above description, but should instead be determined with reference to the appended claims, along with the full scope of equivalents to which such claims are entitled. The disclosures of all articles and references, including patent applications and publications, are incorporated herein by reference for all purpose.

What is claimed is:

1. A process for the preparation of low-affinity, low molecular weight heparin, said process comprising:

(i) depolymerizing unfractionated heparin;

(ii) oxidizing the low molecular weight heparin resulting from step (i); and (iii) reducing the oxidized, low molecular weight heparin resulting from step (ii).

2. The process in accordance with claim 1, wherein said unfractionated heparin is depolymerized using nitrous acid.

3. The process in accordance with claim 1, wherein said nitrous acid is formed in situ from sodium nitrite and hydrochloric acid.

4. The process in accordance with claim 1, wherein said depolymerization step is carried at a temperature ranging from about 18° C. to about 28° C.

5. The process in accordance with claim 1, wherein said low molecular weight heparin is oxidized using sodium periodate.

6. The process in accordance with claim 1, wherein said oxidation step is carried out at a temperature of about 4° C. to about 10° C.

7. The process is in accordance with claim 1, wherein said oxidized, low molecular weight heparin is reduced using sodium borohydride.

8. The process is in accordance with claim 1, wherein said reducing step is carried out at a temperature ranging from about 4° C. to about 10° C.

9. The process is in accordance with claim 1, further comprising the steps of:

(iv) dialyzing the product of step (iii) against distilled water; and (v) recovering the product of step (iv) by lyophilization.

10. The process is in accordance with claim 9, further comprising the step of (vi) passing the low affinity, low molecular weight heparin resulting from step (v) over an antithrombin III affinity column and retaining the effluent.

11. The process is in accordance with claim 9, wherein the dialyzing is carried out using an ultrafiltration system.

12. The process in accordance with claim 1, wherein said low affinity, low molecular weight heparin has a weight-average (Mw) molecular weight of between about 3,000 to about 8,000 Daltons.

13. The process in accordance with claim 1, wherein said low affinity, low molecular weight heparin has an antithrombin III (ATIII) affinity of less than about 3% of that of unfractionated heparin.

14. The process in accordance with claim 1, wherein said low affinity, low molecular weight heparin has:

(i) a heparin cofactor II specific activating activity against thrombin (IIa) of about 2 to about 5 units/mg in an antifactor IIa assay;

(ii) an antithrombin III (ATIII) specific activating activity against factor Xa of about 0.2 to about 1.5 units/mg in an antifactor Xa assay; and (iii) a solubility in aqueous media ranging from about 0.1 to about 1,000 mg/ml.

15. The process in accordance with claim 1, wherein said low affinity, low molecular weight heparin has a uronic acid residue or other native, nonreducing sugar as one end group and a 2,5-anhydromannitol nonreducing sugar as the other end group.

16. The process in accordance with claim 1, wherein said low affinity, low molecular weight heparin has the general formula:

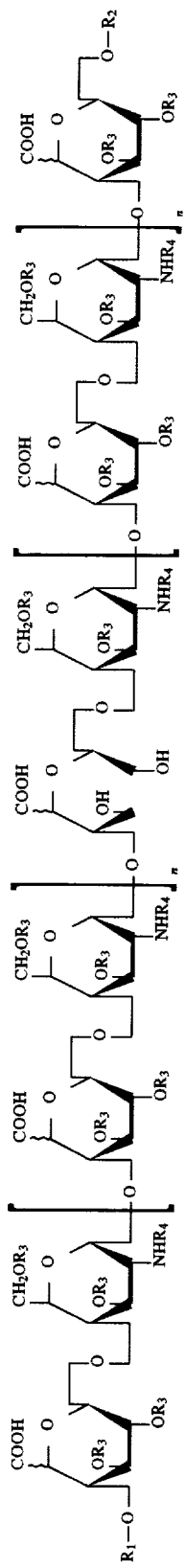

in which:

R$_1$ is a member selected from the group consisting of H and D-glucosamine acid residue;

R$_2$ are members independently selected from the group consisting of H, D-glucosamine acid residue, and anhydromannitol;

R$_3$ is a member selected from the group consisting of H and SO$_3$—; and

R$_4$ is a member selected from the group consisting of H, SO$_3$— and —COCH$_3$; and the n indexes are independently selected and can have values ranging from 0 to about 14;

wherein:

the low affinity, low molecular weight heparin has a weight-average (Mw) molecular weight ranging from 3,000 to about 8,000 Daltons.

17. A process for the preparation of low-affinity, low molecular weight heparin, said process comprising:

(i) depolymerizing unfractioned heparin using nitrous acid;

(ii) isolating and pooling the depolymerized fractions resulting from step (i) and having molecular weights ranging from about 3,000 to 8,000 Daltons to provide a low molecular weight fraction;

(iii) oxidizing the low molecular weight fraction resulting from step (ii) using periodate; and (iv) reducing the oxidized fraction resulting from step (iii) using sodium borohydride, wherein optionally an antithrombin III affinity column is used to reduce the affinity of the depolymerized heparin.

18. The process in accordance with claim 17, wherein said low affinity, low molecular weight heparin has an antithrombin III (ATIII) affinity of less than about 3% of that of unfractionated heparin.

19. The process in accordance with claim 17, wherein said low affinity, low molecular weight heparin has:

(i) a heparin cofactor II specific activity against heparin cofactor II of about 2 to about 5 units/mg in an antifactor IIa assay;

(ii) an antithrombin III (ATIII) specific activity against factor Xa of about 0.2 to about 1.5 units/mg in an anti-factor Xa assay; and (iii) a solubility in aqueous media ranging from about 0.1 to about 1,000 mg/ml.

20. The process in accordance with claim 17, wherein said low affinity, low molecular weight heparin has a uronic acid residue or other native, nonreducing sugar as one end group and a 2,5-anhydromannitol nonreducing sugar as the other end group.

21. A process for the preparation of low affinity, low molecular weight heparin, said process comprising:

(i) depolymerizing standard unfractionated heparin by nitrous acid depolymerization;

(ii) oxidizing the depolymerized heparin resulting from step (i) with sodium periodate in an aqueous medium for about 72 hours at a temperature ranging from 4° C. to about 10° C., and stopping the oxidation reaction by the addition of excess glycerol followed by dialysis against distilled water using an ultrafiltration device equipped with a 3,000 MWCO membrane;

(iii) reducing the oxidized product resulting from step (ii) by the addition of sodium borohydride and, after allowing the reaction mixture to stand for 3 to about 4 hours at a temperature ranging from about 4° C. to about 10° C., adjusting the pH of the reaction mixture to a pH of about 3.0 to about 4.0 with HCl to destroy excess borohydride and then increasing the pH of the reaction mixture to a pH of about 6.0 to about 7.0 by the addition of NaOH;

(iv) dialyzing the product resulting from step (iii) against distilled water; and (v) recovering the product resulting from step (iv) by lyophilization; and optionally (vi) passing the product resulting from step (v) over an antithrombin III affinity column.

22. The process in accordance with claim 21, wherein said low affinity, low molecular weight heparin has a weight-average (Mw) molecular weight of between about 3,000 to about 8,000 Daltons.

23. The process in accordance with claim 21, wherein said low affinity, low molecular weight heparin has:

(i) a heparin cofactor II specific activity against thrombin (iia) of about 2 to about 5 units/mg in an antifactor IIa assay;

(ii) an antithrombin III (ATIII) specific activity against factor Xa of about 0.2 to about 1.5 units/mg in an antifactor Xa assay; and (iii) a solubility in aqueous media ranging from about 0.1 to about 1,000 mg/ml.

24. The process in accordance with claim 21, wherein said low affinity, low molecular weight heparin has an anticoagulant effect which is contributed to by both an HCII- and ATIII-mediated mechanisms, and by a mechanism which is independent of both HCII and ATIII.

25. The process in accordance with claim 21, wherein said low affinity, low molecular weight heparin has a uronic acid residue or other native, nonreducing sugar as one end group and a 2,5-anhydromannitol nonreducing sugar as the other end group.

26. The process in accordance with claim 21, wherein said low affinity, low molecular weight heparin has the general formula:

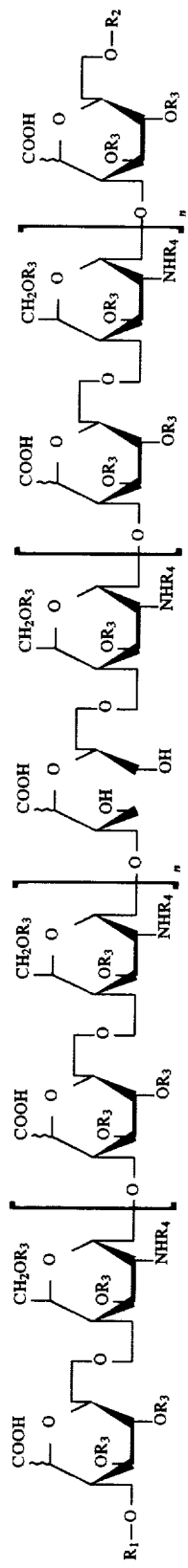

in which:
- R₁ is a member selected from the group consisting of H and D-glucosamine acid residue;
- R₂ are members independently selected from the group consisting of H, D-glucosamine acid residue, and anhydromannitol;
- R₃ is a member selected from the group consisting of H and SO₃—; and
- R₄ is a member selected from the group consisting of H, SO₃— and —COCH₃;

the n indexes are independently selected and can have values ranging from 0 to about 14;

wherein:

the low affinity, low molecular weight heparin has a weight-average (Mw) molecular weight ranging from 3,000 to about 8,000 Daltons.

* * * * *